United States Patent
Jung et al.

(10) Patent No.: US 12,384,695 B2
(45) Date of Patent: Aug. 12, 2025

(54) WATER PURIFIER

(71) Applicant: COWAY CO., LTD., Chungcheongnam-do (KR)

(72) Inventors: Hee Do Jung, Gwanak-gu (KR); Jong Hwan Lee, Gwanak-gu (KR); Hyun Goo Kim, Gwanak-gu (KR); Yoo Won Oh, Gwanak-gu (KR); Chan Jung Park, Gwanak-gu (KR); Woong Jung, Gwanak-gu (KR)

(73) Assignee: COWAY CO., LTD., Chungcheongnam-do (KR)

( * ) Notice: Subject to any disclaimer, the term of this patent is extended or adjusted under 35 U.S.C. 154(b) by 365 days.

(21) Appl. No.: 18/247,954

(22) PCT Filed: Oct. 8, 2021

(86) PCT No.: PCT/KR2021/013945
§ 371 (c)(1),
(2) Date: Apr. 5, 2023

(87) PCT Pub. No.: WO2022/075819
PCT Pub. Date: Apr. 14, 2022

(65) Prior Publication Data
US 2023/0373817 A1 Nov. 23, 2023

(30) Foreign Application Priority Data

Oct. 8, 2020 (KR) .................. 10-2020-0130279
Oct. 8, 2020 (KR) .................. 10-2020-0130280
Oct. 8, 2020 (KR) .................. 10-2020-0130281

(51) Int. Cl.
*C02F 1/00* (2023.01)
*B01D 35/04* (2006.01)
(Continued)

(52) U.S. Cl.
CPC .............. *C02F 1/003* (2013.01); *B01D 35/04* (2013.01); *B01D 35/157* (2013.01);
(Continued)

(58) Field of Classification Search
CPC ..................... C02F 1/003; C02F 2201/004; C02F 2209/00; C02F 2303/04; C02F 2201/006;
(Continued)

(56) References Cited

U.S. PATENT DOCUMENTS

| 4,741,823 | A | * | 5/1988 | Olsen | B01D 61/10 210/96.2 |
| 6,436,282 | B1 | * | 8/2002 | Gundrum | B01D 65/00 210/257.2 |
| 9,914,096 | B2 | * | 3/2018 | Sun | B01D 61/025 |

FOREIGN PATENT DOCUMENTS

| CN | 105879459 A | 11/2018 | |
| EP | 2537569 A1 * | 12/2012 | ............. B01D 35/00 |

(Continued)

OTHER PUBLICATIONS

International Search Report mailed on Jan. 3, 2022 in PCT/KR2021/013945 filed on Oct. 8, 2021 (2 pages).

*Primary Examiner* — Terry K Cecil
(74) *Attorney, Agent, or Firm* — Oblon, McClelland, Maier & Neustadt, L.L.P.

(57) ABSTRACT

A water purifier may include: a filter filtering raw water to provide purified water; a discharge port through which the purified water is discharged outside; water pipes providing a flow space for the purified water to flow; a flow path module including a body part supporting the water pipes; and a tubing assembly detachably connected to the water pipes to selectively open and close at least a portion of the water pipes when connected thereto. The tubing assembly has one side connected to the filter and the other side connected to the flow path module, and the flow path module (Continued)

receives the purified water filtered by the filter through the tubing assembly. The flow path module may be placed above the tubing assembly, and disposed between the filter and the discharge port while overlapping at least a portion of the tubing assembly without overlapping the filter when viewed from above.

15 Claims, 15 Drawing Sheets

(51) Int. Cl.
    *B01D 35/157*     (2006.01)
    *B01D 35/30*     (2006.01)

(52) U.S. Cl.
    CPC ...... *B01D 35/306* (2013.01); *C02F 2201/004* (2013.01); *C02F 2209/00* (2013.01); *C02F 2303/04* (2013.01)

(58) Field of Classification Search
    CPC ... C02F 2307/10; B01D 35/04; B01D 35/157; B01D 35/306; B67D 1/00; B67D 1/08; B67D 1/12
    See application file for complete search history.

(56) References Cited

FOREIGN PATENT DOCUMENTS

| | | |
|---|---|---|
| KR | 10-2019-0024760 A | 3/2019 |
| KR | 10-1987942 B1 | 6/2019 |
| KR | 10-2019-0108381 A | 9/2019 |
| KR | 10-2020-0075166 A | 6/2020 |

\* cited by examiner

WATER PURIFIER

TECHNICAL FIELD

The present disclosure relates to a water purifier.

BACKGROUND ART

In general, a water purifier is a device that receives raw water from a raw water source such as tap water, filters the raw water into purified water, and then provides the purified water to a user. Such purified water may be immediately provided to the user, but may be provided as cold water after being cooled to a predetermined temperature or lower, or as hot water heated to a preset temperature or higher. In addition, the water purifier includes a plurality of flow paths through which purified water, cold water, and hot water respectively flow to provide the purified water, the cold water, and the hot water to the user.

Meanwhile, when the water purifier is used for a long time, the flow path needs to be replaced due to water stains. Conventionally, in order to replace the flow path, a cover is separated from a main body, and then the flow path is replaced after separating the flow path from components such as a filter. However, in order to replace the flow path by separating it from the filter, it is necessary to clearly know the internal structure of the water purifier, which makes it difficult for a user to replace the flow path. In addition, in order to replace a plurality of flow paths in the water purifier, it is inconvenient to separate each of the plurality of flow paths from the filter and replace them. Accordingly a water purifier for a user to easily replace a flow path has been developed.

Korean Patent Application Publication No. 10-2019-0020540 of the present applicant "Water filter connection module and water treatment device including the same" discloses a water filter connection module provided to be separable from a water filter and a water treatment device. However, according to the conventional water filter connection module, in order to replace the water filter connection module, it is required to separate the water filter connection module from a plurality of peripheral components such as a water filter, a water supply source, a drain pipe, and a storage tank. As such, in order to replace the water filter connection module, it is necessary to know the connection relationships between the connection module and the plurality of peripheral components, and the inconvenience of separating the plurality of peripheral components from the connection module still exists.

In addition, in the conventional water treatment device, a configuration for guiding a position where the water filter connection module is placed is not disclosed, and thus it is difficult for a user to place the water filter connection module in an accurate position. Further, when the direction in which the water filter connection module is placed is incorrect, it may be incorrectly connected to the plurality of peripheral components such as the water filter, the water supply source, the drain pipe, and the storage tank. In this case, it is required to release the connection and rearrange the connection module.

Accordingly, there is a need for a module which allows a general user, who does not specifically know the internal structure of the water purifier to easily replace a flow path inside the water purifier. In addition, there is a need for a device capable of guiding the position of the module so that the user can place the module in an accurate position.

In addition, the water purifier includes a circuit board that controls operation of the water purifier, and when the circuit board is in poor operation or used for a long time, maintenance of the circuit board is required. However, in the conventional water purifier, since the circuit board is disposed inside the water purifier, all peripheral components need to be separated in order to expose the circuit board to the outside. Due to this, it takes a lot of effort and time for an operator to maintain or replace the circuit board.

Accordingly, there is a need for a device that allows a user to easily maintain and repair the circuit board and that reduces the time required for maintenance.

In addition, the conventional water treatment device does not disclose a configuration for preventing the connection module from being separated from the placed portion when the water filter connection module is placed, so there is a risk of the connection module being separated from its correct, position. Moreover, when the water filter connection module is separated from its original position, some connections between the connection module and the water filter, the water supply source, the drain pipe, and the storage tank may be disconnected, resulting in a risk of water leakage.

Accordingly, there is a need for a device capable of preventing the connection module from being separated from its correct position, and water leakage due to disconnection with the peripheral components.

PRIOR ART DOCUMENT (Patent Document 1) Korean Patent Application Publication No. 10-2019-0020540 (published on Mar. 4, 2019)
(Patent Document 2) US Patent Application Publication 2018-0078884 (published on Mar. 22, 2018)

DETAILED DESCRIPTION OF INVENTION

Technical Problems

In view of the above, embodiments of the present disclosure provide a water purifier which allows a general user who does not specifically know the internal structure of the water purifier to easily replace a flow path inside the water purifier.

In addition, embodiments of the present disclosure provide a water purifier capable of replacing a plurality of flow paths at once by separating one flow path module from a main body.

Further, embodiments of the present disclosure provide a water purifier capable of connecting each of the plurality of flow paths with other components simply by mounting the flow path module in a correct position on a bracket.

Furthermore, embodiments of the present disclosure provide a water purifier in which a cover frame can be fixedly supported on a main frame while the cover frame is separated from the bracket to prevent the cover frame from arbitrarily covering an upper side of the bracket.

In addition, embodiments of the present disclosure provide a water purifier in which a circuit board including a plurality of boards and wires can be separated from the bracket while being supported on the cover frame, so the user can easily replace the flow path module without interference between the cover frame and the circuit board while replacing the flow path module.

Further, embodiments of the present disclosure provide a water purifier in which the circuit board can be easily maintained by being fixedly supported on the main frame while the circuit board is separated from the cover frame.

Embodiments of the present disclosure provide a water purifier capable of preventing the cover frame from being closed when the flow path module is in a state in which it can be separated from the bracket.

Further, embodiments of the present disclosure provide a water purifier which makes the user aware that the flow path module is in the separable state, so that the user can confirm once again whether a separation preventing member is engaged with the flow path module.

In addition, embodiments of the present disclosure provide a water purifier capable of preventing leakage of water between the flow path module and a tubing assembly by preventing the flow path module from being separated from its correct position.

Technical Solution

In accordance with an aspect of the present disclosure, there is provided a filter for filtering raw water to provide purified water; a discharge port through which the purified water is discharged to an outside; a plurality of water pipes providing a flow space for the purified water to flow; a flow path module including a body part supporting the plurality of water pipes; and a tubing assembly detachably connected to the plurality of water pipes, the tubing assembly serving to selectively open and close at least a portion of the plurality of water pipes when connected to the plurality of water pipes, wherein the tubing assembly has one side connected to the filter and the other side connected to the flow path module, and the flow path module receives the purified water filtered by the filter through the tubing assembly, wherein the flow path module is placed above the tubing assembly, and is disposed between the filter and the discharge port while overlapping at least a portion of the tubing assembly without overlapping the filter when viewed from above, wherein each of the plurality of water pipes includes a passage part through which the purified water flows, an inlet part provided on one side of the passage part through which the purified water flows in and including an inlet, and an outlet part provided on the other side of the passage part through which the purified water is discharged and including an outlet, and wherein the inlet and the outlet provided in each of the plurality of water pipes are exposed to the outside of the body part and opened downward.

Further, the inlet part and the outlet part provided in each of the plurality of water pipes may be extended downward.

Further, the body part may support the passage part, and have a plurality of through holes, the inlet part and the outlet part may protrude outward from the body through the plurality of through holes, and the plurality of through holes may be formed on a same surface of the body part.

Further, at least a portion of the passage parts of the plurality of water pipes may extend in different directions, and each of the plurality of water pipes may be configured such that the flow space does not communicate with each other in the body part.

Further, the inlet and the outlet provided in at least one of the plurality of water pipes may have different sizes from each other Further, at least one of the plurality of water pipes may have a different shape from another one thereof.

Further, the tubing assembly may include a plurality of connectors which are selectively engaged with the inlet parts and the outlet parts of the plurality of water pipes, respectively, each of the inlet parts and the outlet parts of the plurality of water pipes may have a predetermined rigidity so that a shape thereof does not change when engaged with the connector.

Further, the inlet and the outlet provided in at least one of the plurality of water pipes may have different sizes from each other, and each of the plurality of connectors may have a size corresponding to the inlet and the outlet provided in each of the plurality of water pipes.

Further, an orientation determination portion having a protrusion or recess shape may be provided on an outer surface of the body part so that the body part has an asymmetrical shape, and the orientation determination portion may have a shape protruding or depressed laterally from the outer surface of the body part.

Further, the water purifier may further include: a cooler for cooling the purified water to provide cold water; and a cold water flow part through which the cold water obtained by the cooler flows, wherein the flow path module may be disposed above the cooler and the cold water flow part.

Further, the water purifier may further include: a frame including a main frame and a cover frame, wherein the cover frame may be configured such that the cover frame is placed in a cover position where the cover frame covers the flow path module or separated from the cover position so that the flow path module is exposed to the outside.

Further, the water purifier may further include: a circuit board, for controlling operation of the water purifier, supported by the cover frame, wherein when the cover frame is separated from the cover position, the circuit board may be separated from the cover position together with the cover frame.

Further, the water purifier may further include: a bracket having a seating portion on which the body part is seated when the flow path module is connected to the tubing assembly, wherein the seating portion is a hole concavely formed in the bracket to surround at least a portion of a lower surface and at least a portion of a side surface of the flow path module, wherein when placed in the cover position, the cover frame is disposed above the bracket to cover an upper surface of the flow path module, wherein an orientation determination portion, having a protrusion or recess shape, for guiding a direction in which the flow path module is seated in the seating portion is provided on an outer surface of the body part, wherein the seating portion is provided with an engaging part having a shape corresponding to the orientation determination portion, and wherein the orientation determination portion engages with the engaging part when the flow path module is seated in a predetermined direction on the seating portion, and when the flow path module is seated in the seating portion in a direction different from the predetermined direction, the orientation determination portion does not engage with the engaging part and interferes with the bracket.

Further, the water purifier may further include: a bracket having a seating portion on which the body part is seated when the flow path module is connected to the tubing assembly; and a separation preventing member for preventing the flow path module from being separated from the bracket when the flow path module is connected to the tubing assembly, wherein the separation preventing member may be supported by the bracket and selectively interferes with an upper side of the body part of the flow path module to prevent separation of the flow path module.

The water purifier may further include: a cover frame that covers the flow path module when a position of the cover frame relative to the bracket is a cover position, wherein the separation preventing member may allow the cover frame to be placed in the cover position when selectively interfering with the flow path module to prevent separation of the flow path module, and wherein the separation preventing member may interfere with the cover frame to prevent the cover frame from being placed in the cover position when allowing the flow path module to be separated from the seating portion.

The water purifier may further include: a main frame that accommodates the filter and the tubing assembly, wherein the cover frame may be placed in an open fixed position where the cover frame is engaged and fixed to the main frame in an inclined state with respect to the cover frame in the cover position, or the cover position.

The body part may be provided with a protruding hook, and when engaged with the hook, the separation preventing member may selectively interfere with the flow path module to prevent separation of the flow path module and allows the cover frame to be placed in the cover position.

Effect of Invention

According to embodiments of the present disclosure, even a general user who does not specifically know the internal structure of the water purifier can easily replace the flow path inside the water purifier.

In addition, the user can replace the plurality of flow paths at once by separating one flow path module from the main body.

Further, each of the plurality of flow paths can be connected with other components only by mounting the flow path module at the correct position on the bracket.

Furthermore, the cover frame can be fixedly supported on the main frame while being separated from the bracket to prevent the cover frame from arbitrarily covering the upper side of the bracket.

In addition, since the circuit board including the plurality of boards and wires is separated from the bracket while being supported on the cover frame, the user can easily replace the flow path module without interference between the cover frame and the circuit board while replacing the flow path module.

Further, since the circuit board is fixedly supported on the main frame while being separated from the cover frame, the circuit board can be easily maintained.

Furthermore, the cover frame can be prevented from being closed when the flow path module is in the state in which it can be separated from the bracket.

In addition, it is possible to make the user aware that the flow path module is in the state in which it can be separated, and thus, the user can confirm once again whether the separation preventing member is engaged with the flow path module.

Further, it is possible to prevent water leakage between the flow path module and the tubing assembly by preventing the flow path module from being separated from its correct position.

BEST MODE FOR CARRYING OUT THE INVENTION

A preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, 'supported' by, 'flowed' into, 'supplied' to, 'floated' in, 'fastened' with, 'flowed' out, 'discharged' out, or 'accessed' by another element, it should be understood that the element may be directly connected to, supported by, flowed into, supplied to, floated in, fastened with, flowed out, discharged out, or accessed by the other element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

In addition, in the present specification, expressions for directions such as upward and downward are described based on the drawings, and it is said in advance that they may be expressed differently when the direction of the object is changed. Meanwhile, in the present specification, a leftright direction may be the x-axis direction of FIGS. 1 to 3 and 7, and a front-rear direction may be the y-axis direction of FIGS. 1 to 3 and 7. In addition, an up-down direction may be the z-axis direction of FIGS. 1 to 3 and 7.

Hereinafter, a specific configuration of a water purifier 1 according to one embodiment of the present disclosure will be described with reference to the drawings.

Figure 1:
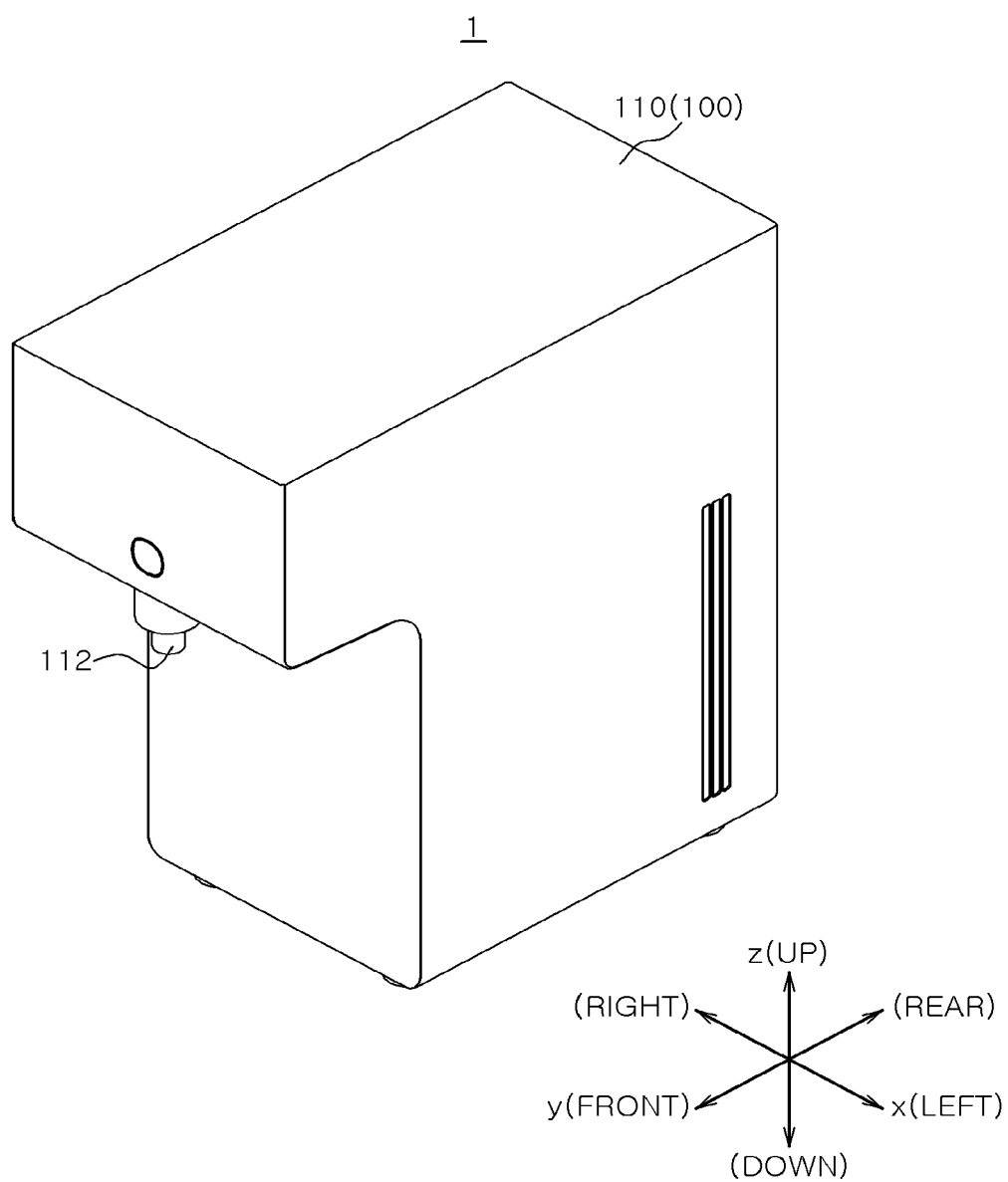
FIG. 1 is a perspective view showing a water purifier according to one embodiment of the present disclosure.
Figure 13:
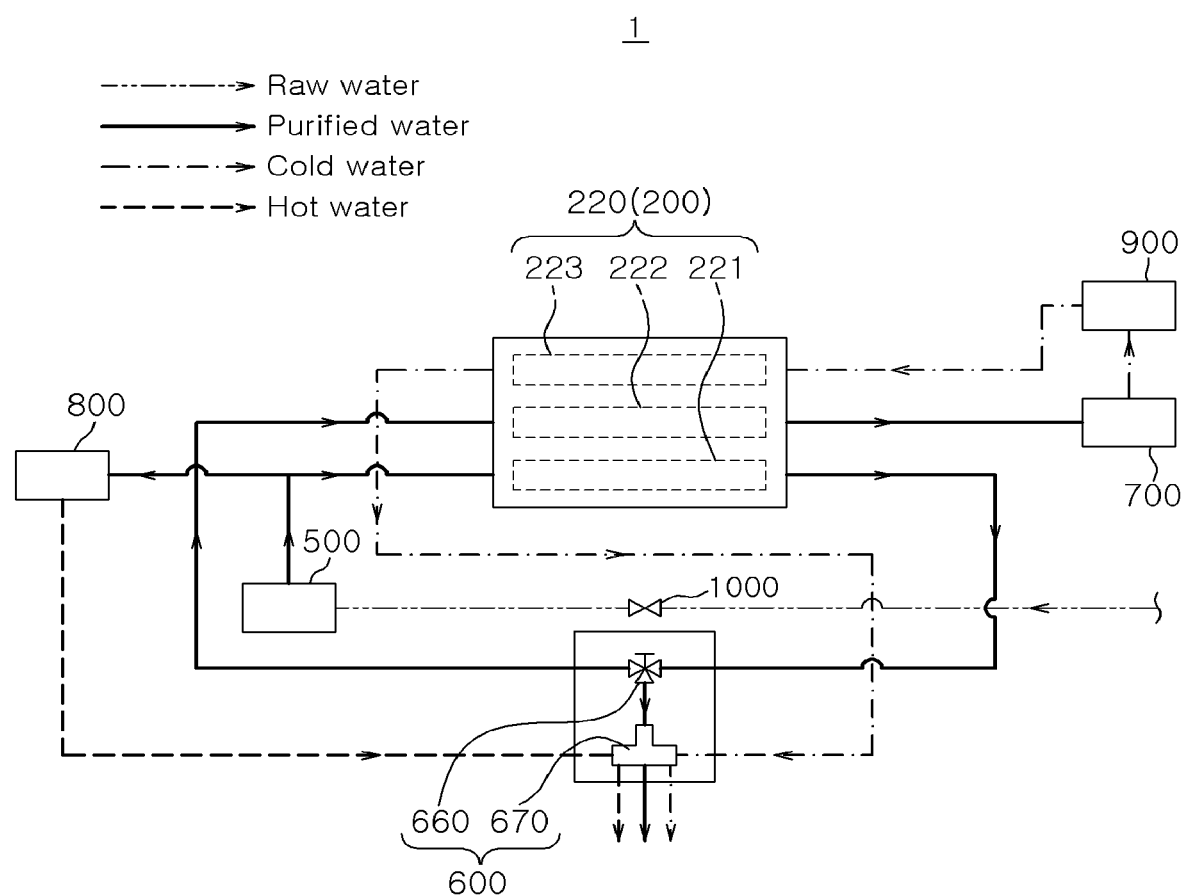
FIG. 13 is a conceptual diagram schematically illustrating a flow of water in the water purifier according to one embodiment of the present disclosure.

Hereinafter, referring to FIGS. 1, 4 and 13, the water purifier 1 according to one embodiment of the present disclosure can provide clean water to users by filtering water supplied from the outside. For example, the water purifier 1 can receive water from a water supply source (not shown) such as tap water, and filter the supplied water into clean water. The water purifier 1 may include a frame 100, a flow path module 200, a bracket 300, a separation preventing member 400, a filter 500, a tubing assembly 600, a cooler 700, a heater 800, a cold water flow unit 900, a NOS valve 1000, and a circuit board 1100.

Meanwhile, water introduced into the water purifier 1 from the outside may be classified into raw water, purified water, cold water, and hot water. Hereinafter, among water introduced into the water purifier 1 from the outside, water that has not passed through the filter 500 is defined as raw water, and water filtered through the filter 500 is defined as purified water. In addition, among the water filtered by the filter 500, the water cooled to a predetermined temperature or less in the cooler 700 is defined as cold water, and among the water filtered by the filter 500, the water heated by the heater 800 to a predetermined temperature or more is defined as hot water.

Figure 2:
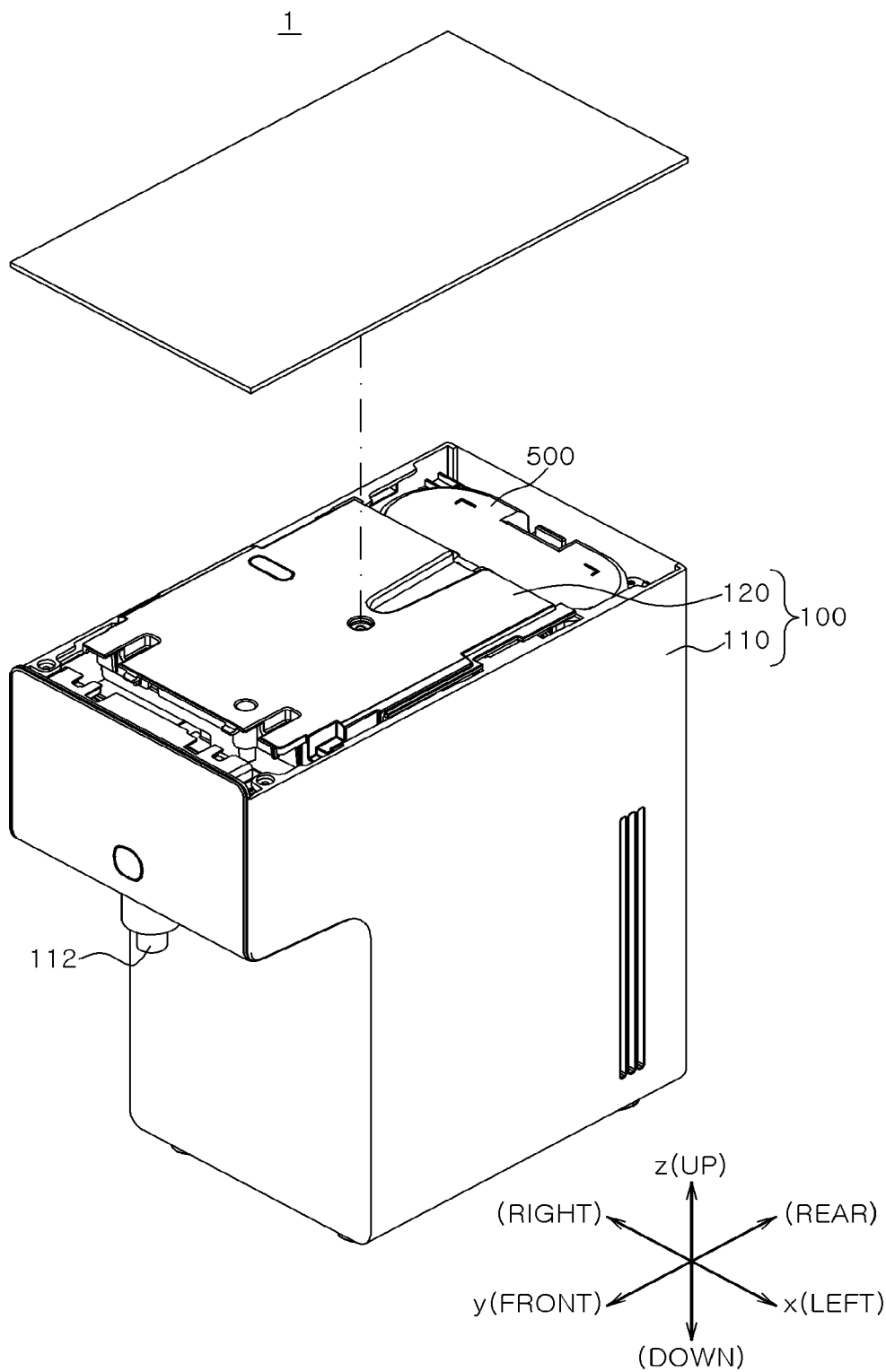
FIG. 2 is a perspective view of the water purifier of FIG. 1 in which an upper cover is separated.
Figure 3:
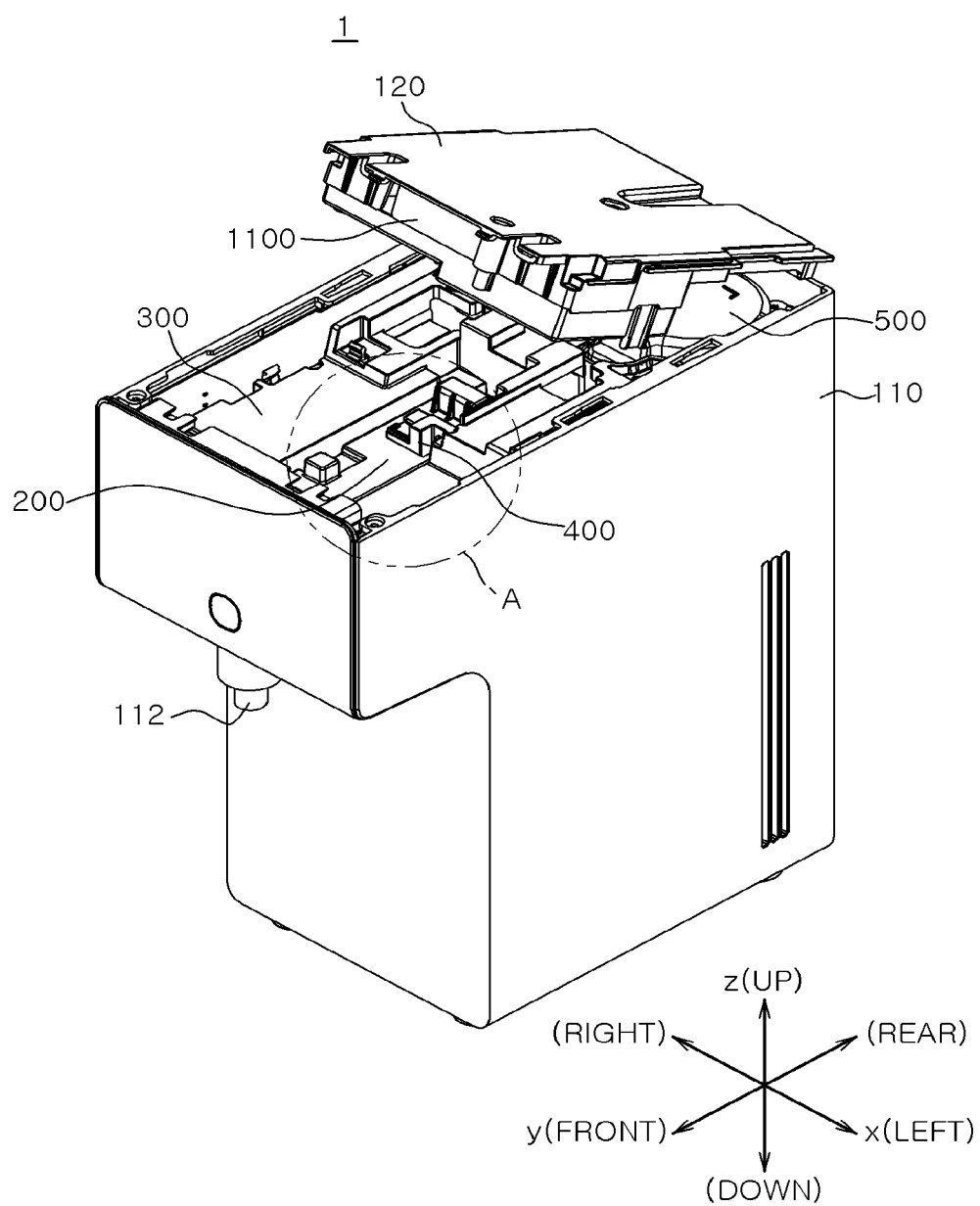
FIG. 3 is a perspective view showing a state in which a cover frame of FIG. 2 is placed in an open and fixed position.

Referring to FIGS. 2 and 3, the frame 100 may provide a space where the flow path module 200, the bracket 300, the separation preventing member 400, the filter 500, the tubing assembly 600, the cooler 700, and the heater 800, the cold water flow unit 900, the NOS valve 1000 and the circuit board 1100 are accommodated. For example, the frame 100 may extend in the up-down direction and may have a shape in which a part of an upper portion thereof protrudes forward. The frame 100 may include a main frame 110 and a cover frame 120.

The main frame 110 may be provided to surround at least a portion of the flow path module 200 the bracket 300, the separation preventing member 400, the filter 500, the tubing assembly 600, the cooler 700, the heater 800 the cold water flow unit 900, the NOS valve 1000, and the circuit board 1100. For example, the main frame 110 may be formed by coupling a plurality of covers to each other with bolts or the like. In addition, the upper cover of the main frame 110 may be selectively separated. However, this is only an example, and other than the bolts, well-known means for coupling the plurality of covers to each other may be used, and the side or bottom cover may be selectively separated.

Meanwhile, the main frame 110 may be provided with a rib 111 that can be engaged with a fixture 121 to be described later when the cover frame 120 is rotated to an open position to be described later. For example, the rib 111 may be formed on an upper portion of a rear side of the main frame 110 and may be provided to correspond to a shape of the fixture 121 so as to be selectively engaged with the fixture 121. As such, as the rib 111 engages with the fixture 121, the open fixed position of the cover frame 120 can be maintained.

In addition, the main frame 110 may be provided with a discharge port 112 for discharging purified water to the outside. The discharge port 112 may communicate with the tubing assembly 600 and may be configured to discharge purified water, cold water, and hot water flowing in the tubing assembly 600 to the outside. For example, the discharge port 112 may be configured to discharge one of purified water, cold water, and hot water to the outside according to a user's selection. In addition, the discharge port 112 may be provided on a front side of the main frame 110 and may be open downward.

Referring again to FIGS. 2 and 3, the cover frame 120 may be supported by the bracket 300 to cover the flow path module 200 seated on the bracket 300. In addition, the cover frame 120 may be separated from the bracket 300 so that the flow path module 200 is exposed to the outside. In this case, the cover frame 120 may be fixedly supported on the main frame 110. However, this is only an example, and the cover frame 120 may be rotatably supported by the bracket 300 or the main frame 110. Further, the cover frame 120 may support the circuit board 1100 and wires connected to the circuit board 1100, and may, be separated from the bracket 300 together with the circuit board 1100.

Figure 15:
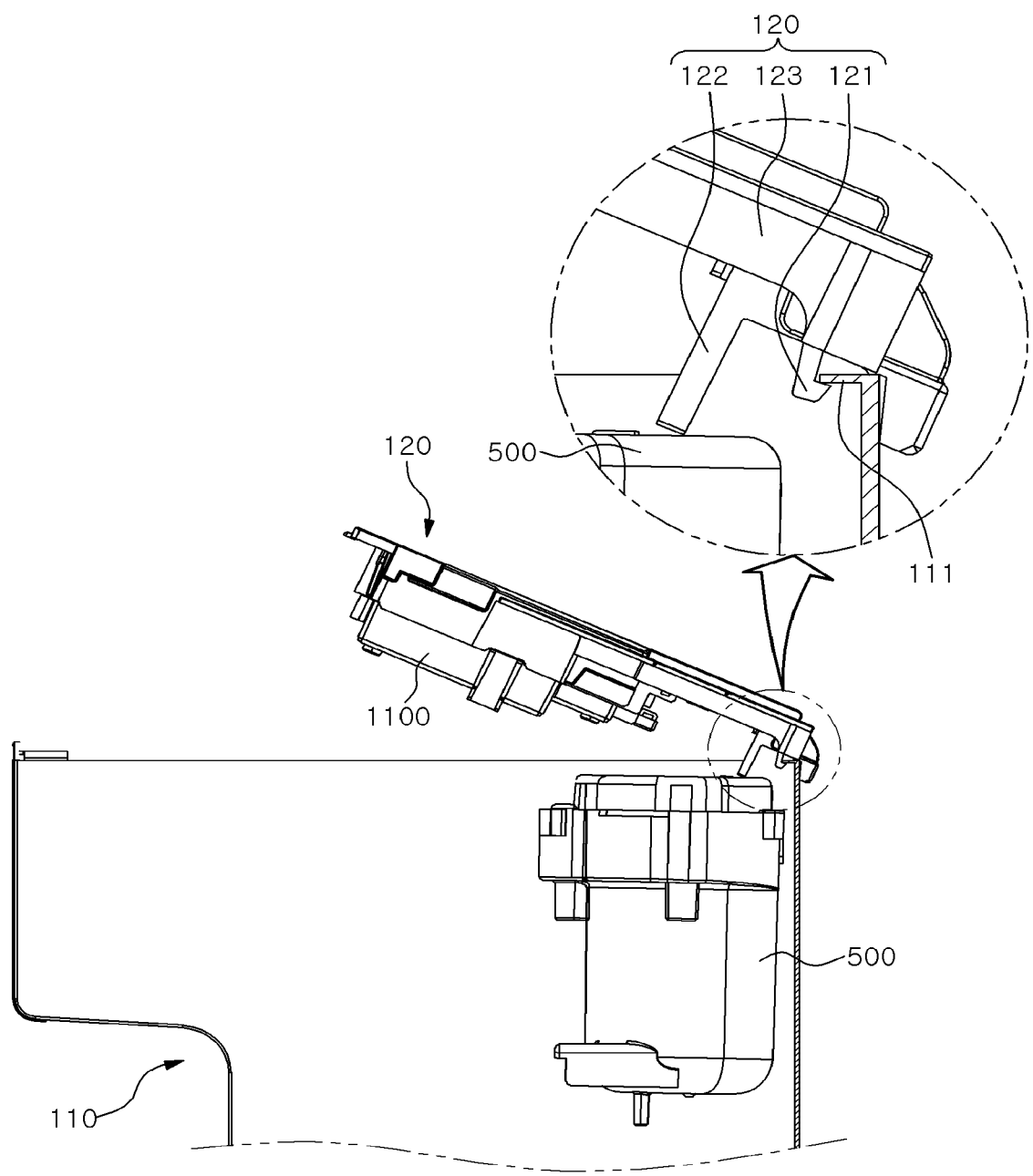
FIG. 15 is a partial cross-sectional view and an enlarged view when the cover frame of FIG. 2 is placed in the open and fixed position.

The cover frame 120 may be selectively placed in any one of a cover position and an open fixed position. For example, as, shown in FIG. 2, the cover frame 120 may be placed in the cover position. In this case, the cover frame 120 may be positioned above the bracket 300 and the flow path module 200, and may block the flow path module 200 from the outside. As another example, as shown in FIGS. 3 and 15, the cover frame 120 may be configured to be separable from the cover position so that the flow path module 200 is exposed to the outside. In other words, the cover frame 120 may be separated from the bracket 300, and the separated cover frame 120 may be placed in the open fixed position. In this case upper portions of the bracket 300 and the flow path module 200 may be opened to the outside, and the flow path module 200 may be separated from the bracket 300 and replaced. In addition, the cover frame 120 placed in the open fixed position may be engaged and fixed to the main frame 110 in an inclined state with respect to the cover frame 120 in the cover position.

The cover frame 120 may include the fixture 121, a support 122, and a cover frame body 123.

The fixture 121 may be engaged with the main frame 110 to maintain the position of the cover frame 120 when the cover frame 120 is placed in an open fixed position. The fixture 121 may be provided at one end of the cover frame body 123 and may be formed on a rear side of the cover frame 120. For example, the fixture 121 may have a hook shape to be engaged with the rib 111. However, this is just an example, and the fixture 121 may be formed on the main frame 110. In addition, the fixture 121 may fix the cover frame 120 placed in the open fixed position to the main frame 110. For example, when a user needs to replace the flow path module 200, the cover frame 120 can be maintained in the open fixed position by the fixture 121 engaged with the rib 111.

In addition, the support 122 may be configured such that the cover frame 120 placed in the open fixed position is supported on the filter 500. For example, the support 122 is supported on the filter 500 or the main frame 110 when the cover frame 120 is placed in the open fixed position. In this way, the cover frame 120 can be maintained in the open fixed position. Moreover, the support 122 may protrude downward from a lower surface of the cover frame body 123, for example.

The cover frame body 123 may cover the flow path module 200 and support the fixture 121 and the support 122.

As described above, by preventing the cover frame 120 from being arbitrarily placed in the cover position, the user can easily replace the flow path module 200 without interference with the cover frame 120 while replacing the flow path module 200. In addition, the circuit board 1100 including a plurality of boards and wires is placed in the open fixed position together with the cover frame 120, and thus when the user replaces the flow path module 200, inconvenience caused by interference with the circuit board 1100 can be eliminated.

In addition, since the length of the wire connected to the circuit board 1100 is limited, the cover frame 120 and the circuit board 1100 have a limited range of movement. However, since the cover frame 120 is fixed to the main frame 110 even within the limited movement range, the open fixed position is maintained while the flow path module 200 is exposed to the outside.

Figure 4:
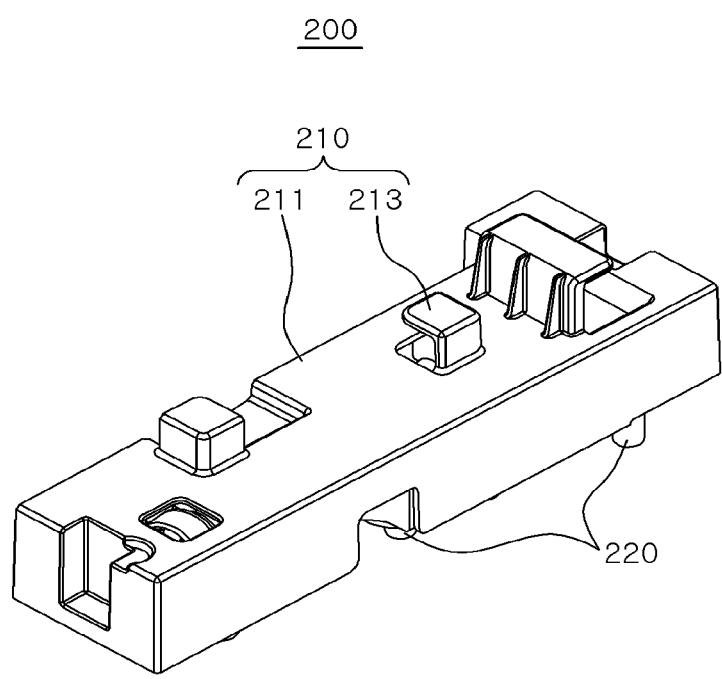
FIG. 4 is a perspective view of a flow path module of FIG. 3.

Referring to FIG. 4, the flow path module 200 may provide a passage through which purified water and cold water flow. The flow path module 200 can communicate with the tubing assembly 600 and is detachably connected to the tubing assembly 600. For example, when the flow path module 200 is connected to the tubing assembly 600, purified water and cold water may flow between the flow path module 200 and the tubing assembly 600. In addition, when the flow path module 200 is connected to the tubing assembly 600, the flow path module 200 may be supplied with purified water from the filter 500 through the tubing assembly 600. That is, the flow path module 200 may be indirectly connected to the filter 500 through the tubing assembly 600 without being, directly connected to the filter 500. The flow path module 200 may include a body part 210 and a water pipe 220.

Figure 5:
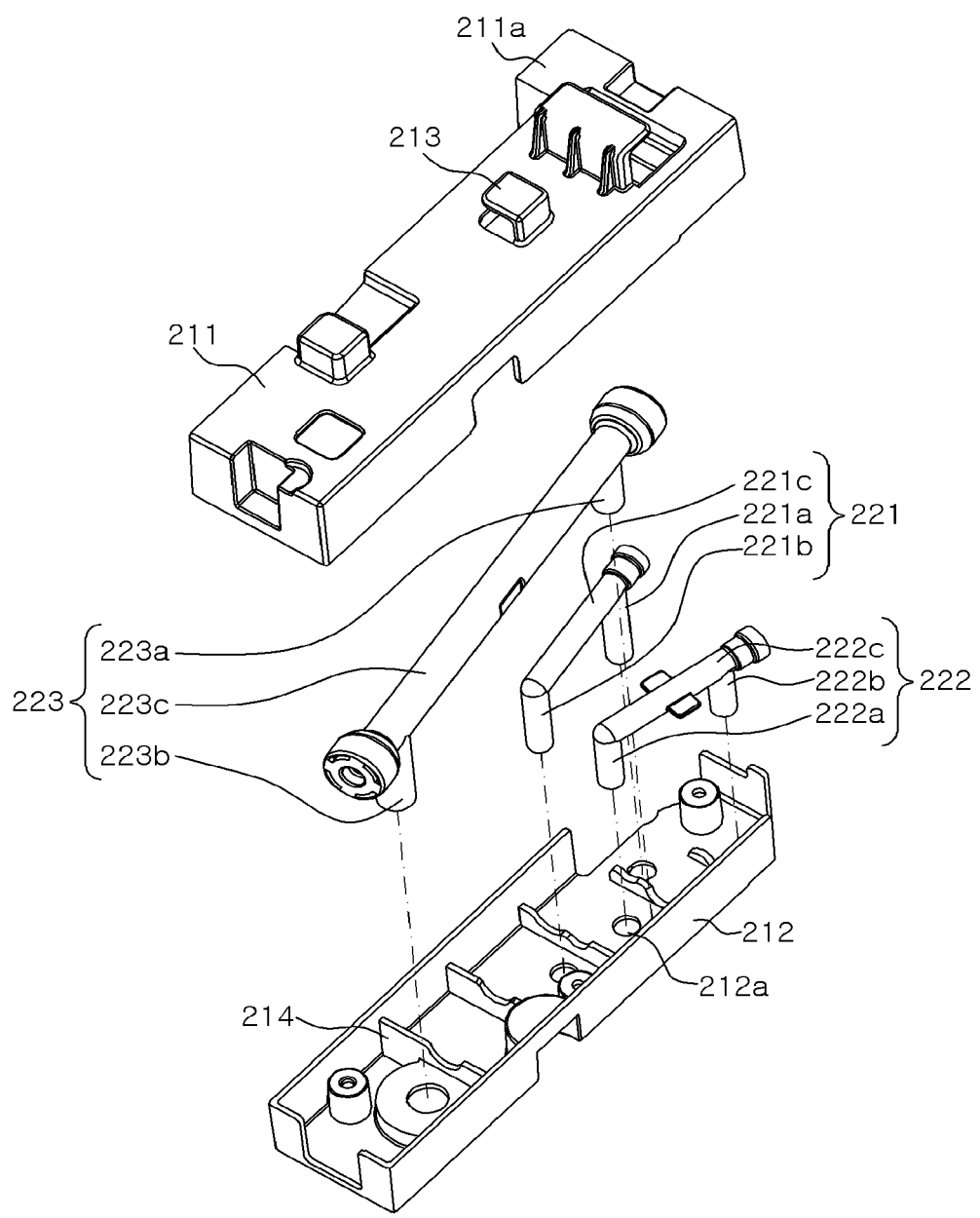
FIG. 5 is an exploded perspective view of the flow path module of FIG. 4.

Referring to FIG. 5, the body part 210 may support a plurality of water pipes 220 and may be provided to surround at least a portion of the plurality of water pipes 220. The body part 210 may be seated on a seating portion 310 of the bracket 300, which will be described later, and when the body part 210 is seated to match the seating portion 310, the water pipe 220 may be connected to the tubing assembly 600. In addition, a shape of the body part 210 may be formed to correspond to a shape of the seating portion 310. The body part 210 may include a first body 211, a second body 212, a hook 213, and a support jaw 214.

The first body 211 may surround the water pipe 220 at an upper side, and the second body 212 may surround the water pipe 220 at a lower side. For example, when the first body 211 and the second body 212 are coupled to each other, at least a portion of the water pipe 220 may be disposed in an inner space between the first body 211 and the second body 212.

Meanwhile, an orientation determination portion 211a may be formed on the first body 211 so that the first body 211 has an asymmetrical shape. When the body part 210 is seated on the seating portion 310, the orientation determination portion 211a may be provided on the first body 211 so as to be seated in a preset direction. The orientation determination portion 211a may be provided to be engaged with an engaging portion 311 of the seating portion 310 to be described later. In addition, the orientation determination portion 211a may be, for example, a protrusion protruding laterally from an outer surface of the first body 211, and may be formed corresponding to a recess shape of the engaging portion 311. However, this is only an example, and the orientation determination portion 211a may have the shape of a recess shape depressed from the outer surface of the first body 211, and the engaging portion 311 may have a protrusion shape, so that the orientation determination portion 211a and the engaging portion 311 are engaged with each other.

For example, the orientation determination portion 211a is engaged with the engagement portion 311 when the body part 210 is seated on the seating portion 310 in the preset orientation. In this case, the body part 210 is placed so as to match the seating portion 310. As another example, the orientation determination portion 211a interferes with the bracket 300 without being engaged with the engagement portion 311 when the body part 210 is seated on the seating portion 310 in an orientation different from the preset direction. In this case, the body part 210 is not seated on the seating portion 310 and a portion of the body part 210 is placed at a position spaced apart from the seating portion 310.

As such, since the first body 211 is configured such that it has an asymmetrical shape and the orientation determination portion 211a is engaged with the engaging portion 311, the body part 210 can be prevented from being seated on the seating part 310 at a position other than the correct position. In addition, the user can immediately recognize whether the body part 210 is seated in an orientation different from the preset orientation.

In addition, a through-hole 212a may be formed in the second body 212. The through-hole 212a may be formed through the second body 212, and the water pipe 220 may extend from the inner space between the first body 211 and the second body 212 to the outside through the through-hole 212a. For example, a plurality, of through-holes 212a may be provided, and the plurality of through-holes 212a may be formed on a same surface of the second body 212.

The hook 213 may prevent the separation, preventing member 400 from rotating beyond a predetermined range. The hook 213 may be engaged with the separation preventing member 400 and may be formed to protrude from an upper surface of the first body 211. For example, the hook 213 may be formed such that a side portion is partially opened so that the separation preventing member 400 can be inserted. In addition, the hook 213 may be located on the rotation path of the separation preventing member 400 when the body part 210 is seated on the seating portion 310.

The support jaw 214 may support a plurality of water pipes 220. The support jaw 214 may protrude upward from the second body 212. In addition, a groove, which is a portion where the water pipe 220 is supported, may be formed in the support jaw 214, and the groove may be formed to correspond to the shape of the water pipe 220.

Figure 6:
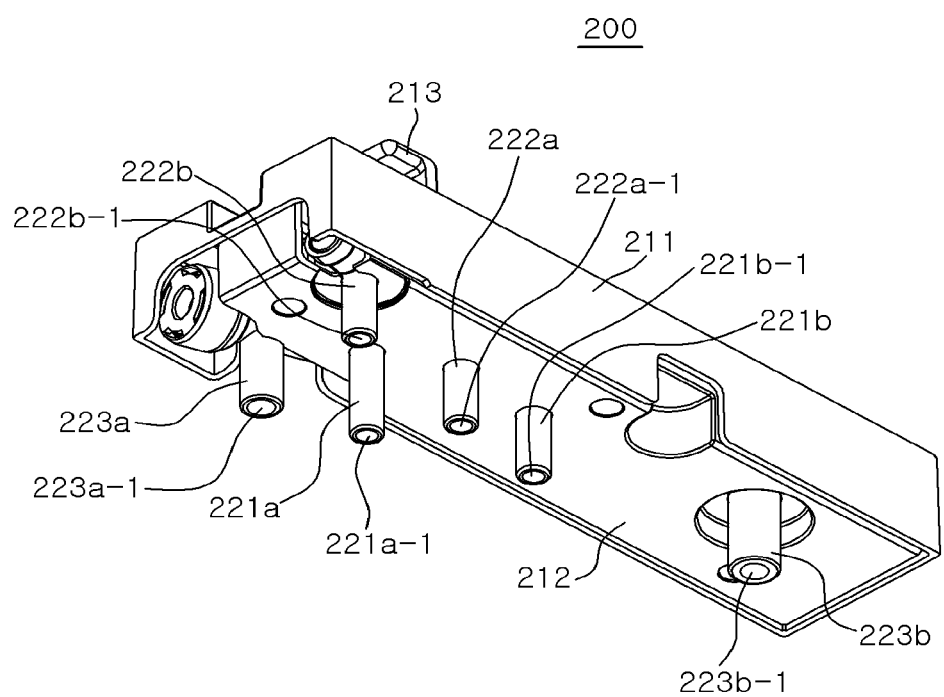
FIG. 6 is a bottom perspective view of the flow path module of FIG. 4.

Referring to FIGS. 5 and 6, the water pipe 220 may provide a flow space for water to flow. A plurality of water pipes 220 may be provided, and the plurality of water pipes 220 may provide flow spaces through which purified water or cold water flows. In addition, the plurality of water pipes 220 may include a first purified water pipe 221, a second purified water pipe 222, and a cold water pipe 223, and at least a portion of the plurality of water pipes 220 may be disposed in an inner space of the body part 210. The first purified water pipe 221, the second purified water pipe 222, and the cold water pipe 223 may be configured not to communicate with each other within the body part 210. In other words, in the body part 210, the purified, water flowing through the first purified water pipe 221, the purified water flowing through the second purified water pipe 222, and the cold water flowing through the cold water pipe 223 are not mixed with each other, and may flow along the respective flow paths. In addition, the first purified water pipe 221, the second purified water pipe 222, and the cold water pipe 223 may have different shapes.

As such, since the first purified water pipe 221, the second purified water purification pipe 222, and the cold water pipe 223 have different shapes, the user can assemble the first purified water pipe 221, the second purified, water pipe 222, and the cold water pipe 223 in place without confusion. That is, when assembling the flow path module 200, incorrect assembly of the first purified water pipe 221, the second purified water pipe 222, and the cold water pipe 223 can be prevented.

Meanwhile, in the present specification, the water pipe 220 may be understood as a different configuration from water connectors 630, 640, and 650. In other words, the water pipe 220 provides a flow space for purified water and cold water to flow, and may be distinguished from the water connectors 630, 640, and 650 that connect some of the plurality of water pipes 220. In addition, the water pipe 220 can be distinguished from a valve that opens and closes a passage. Accordingly, the flow path module 200 includes the plurality of water pipes 220, but does not include the plurality of water connectors 630, 640, and 650 and a feed valve 660.

The first purified water pipe 221 may provide a passage through which purified water flows. In addition, purified water filtered by the filter 500 may be introduced into the first purified water pipe 221, and the first purified water pipe 221 may guide the introduced purified water to the feed valve 660 to be described later. The first purified water pipe 221 may include a first purified water inlet part 221a, a first purified water outlet part 221b, and a first purified water passage 221c.

Figure 12:
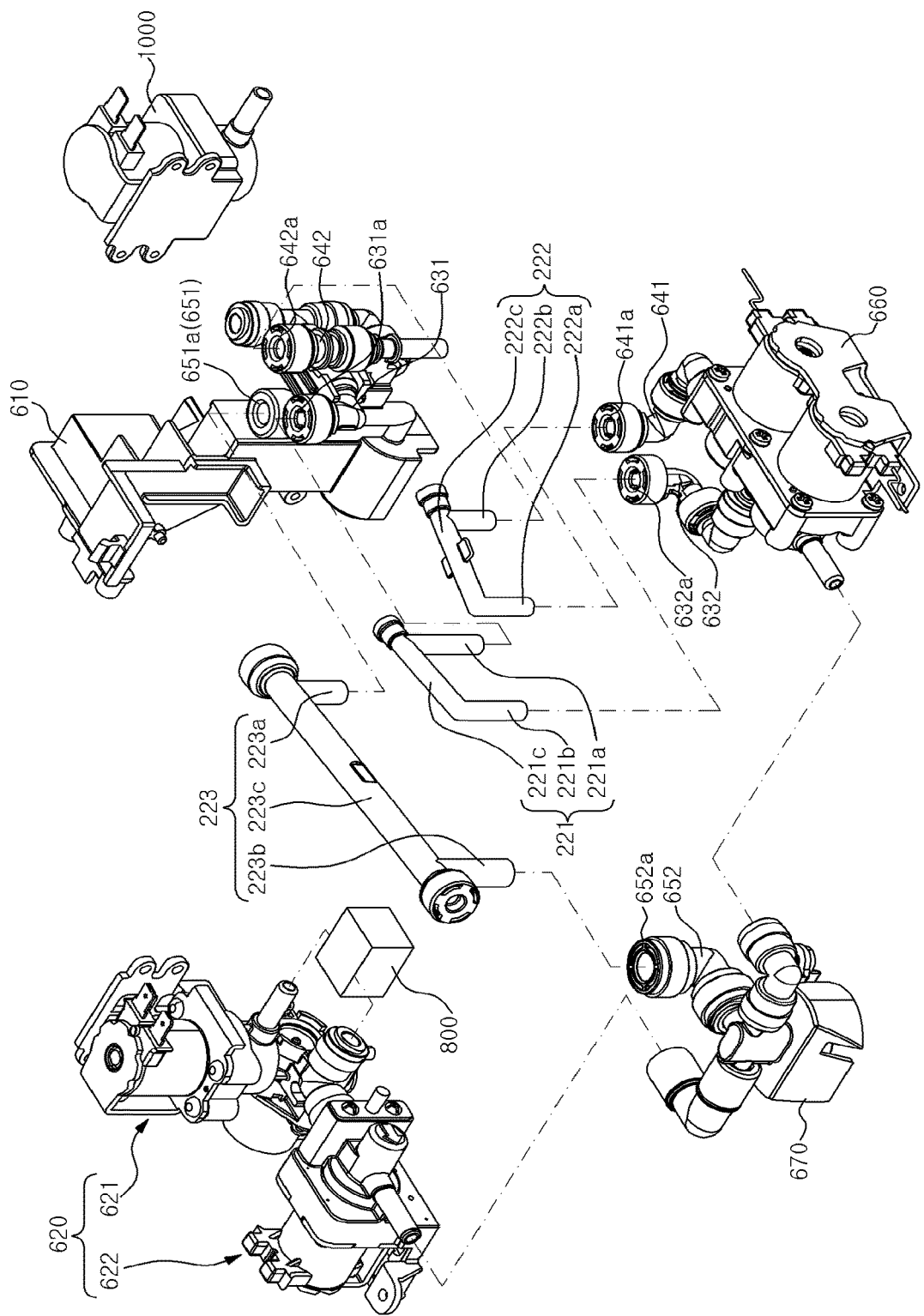
FIG. 12 is a partially exploded perspective view of the flow path module and the tubing assembly of FIG. 10.

Referring to FIGS. 6 and 12, the first purified water inlet part 221a is a portion of the first purified water pipe 221 through which purified water is introduced, and may be provided on one side of the first purified water passage 221c. The first purified water inlet part 221a may be selectively connected to a first purified water inlet connector 631 to be described later. For example, the first purified water inlet part 221a may have a predetermined rigidity so that its shape does not change when engaged with a first purified water inlet connector port 631a to be described later. In, addition, a first purified water inlet 221a-1 for introducing purified water may be formed at one end of the first purified water inlet part 221a. The first purified water inlet 221a-1 may communicate with the first purified water inlet connector port 631a.

The first, purified water outlet part 221b is a portion of the first purified water pipe 221 through which purified water is discharged, and may be provided on the other side of the first purified water passage 221c. The first purified water outlet part 221b may be selectively connected to a first purified water outlet connector 632 to be described later. For example, the first purified water outlet part 221b may have a predetermined rigidity so that its shape does not change when engaged with a first purified water outlet connector port 632a to be described later. In addition, a first purified water outlet 221b-1 through which purified water is discharged may be formed at one end of the first purified water outlet part 221b. The first purified water outlet 221b-1 may communicate with the first purified water outlet connector port 632a.

The first purified water passage 221c may provide a passage through which purified water flows. The first purified water passage 221c may be provided such that one side thereof communicates with the first purified water inlet part 221a and the other side thereof communicates with the first purified water outlet part 221b. In addition, the first purified water passage 221c may be extended in a different direction from at least one of a second purified water passage 222c and a cold water passage 223c.

In this way, the purified water introduced into the first purified water inlet part 221a may flow along the first purified water passage 221c to be discharged through the first purified water outlet part 221b. In addition, the purified water discharged through the first purified water outlet part 221b may be divided in the tubing assembly 600 to be discharged to the outside or to flow into the second purified water pipe 222.

The second purified water pipe 222 may provide a passage for purified water flows. For example, the second purified water pipe 222 may guide purified water to the cooler 700. In addition, in the second purified water pipe 222, the purified water discharged from the first purified water pipe 221 to the tubing assembly 600 may flow, and the purified water discharged from the second purified water pipe 222 may flow to the cooler 700. The second purified water pipe 222 may include a second purified water inlet part 222a, a second purified water outlet 222b, and a second purified water passage 222c.

The second purified water inlet part 222a is a portion of the second water pipe 222 into which purified water is introduced, and may, be provided on one side of the second purified water passage 222c. The second purified water inlet part 222a may be selectively connected to a second purified water inlet connector 641 to be described later. For example, the second purified water inlet part 222a may have a predetermined rigidity so that its shape does not change when engaged with a second purified water inlet connector port 641a to be described later. In addition, a second purified water inlet 222a-1 for introducing purified water may be formed at one end of the second purified water inlet part 222a. The second purified water inlet 222a-1 may communicate with the second purified water connector port 641a.

The second purified water outlet part 222b is a portion of the second purified water pipe 222 through which purified water is discharged, and may be provided on the other side of the second purified water passage 222c. The second purified water outlet part 222b may be selectively connected to a second purified water outlet connector 642 to be described later. For example, the second purified water outlet part 222b may have a predetermined rigidity so that its shape does not change when engaged, with a second purified water outlet connector port 642a to be described later. In addition, a second purified water outlet 222b-1 through which purified water is discharged may be formed at one end of the second purified water outlet part 222b. The second purified water outlet 222b-1 may communicate with the second purified water outlet connector port 642a.

The second purified water passage 222c may provide a passage through which purified water flows. The second purified water passage 222c may be provided such that one side thereof communicates with the second purified water inlet part 222a and the other side thereof communicates with the second purified water outlet part 222b. In addition, the second purified water passage 222c may be extended in a different direction from at least one of the first purified water passage 221c and the cold water passage 223c.

In this way, the purified water introduced into the second purified water inlet part 222a may flow along the second purified water passage 222c to be discharged through the second purified water outlet part 222b. In addition, the purified water discharged through the second purified water outlet part 222b may flow toward the cooler 700.

The cold water pipe 223 may provide a passage through which cold water flows. For example, the cold water pipe 223 may guide cold water passing through the cooler 700 to an outlet part 670 to be described later. The cold water pipe 223 may include a cold water inlet part 223*a*, a cold water outlet part 223*b*, and a cold water passage 223*c*.

The cold water inlet part 223*a* is a portion of the cold water pipe 223 into which cold water is introduced, and may be provided on one side of the cold water passage 223*c*. The cold water inlet part 223*a* may be selectively connected to a cold water inlet connector 651 to be described later. For example, the cold water inlet part 223*a* may have a predetermined rigidity so that its shape does not change when engaged with a cold water inlet connector port 651*a* to be described later. In addition, a cold water inlet 223*a*-1 for introducing cold water may be formed at one end of the cold water inlet part 223*a*. The cold water inlet 223*a*-1 may communicate with the cold water inlet connector port 651*a*.

The cold water outlet part 223*b* is a portion of the cold water pipe 223 through which cold water is discharged, and may be provided on the other side of the cold water passage 223*c*. The cold water outlet part 223*b* may be selectively connected to a cold water outlet connector 652 to be described later. For example, the cold water outlet part 223*b* may have a predetermined rigidity so that its shape does not change when engaged with a cold water outlet connector port 652*a* to be described later. In addition, a cold water outlet 223*b*-1 through which cold water is discharged may be formed at one end of the cold water outlet part 223*b* The cold water outlet 223*b*-1 may communicate with the cold water outlet connector port 652*a*.

The cold water passage 223*c* may provide a passage through which cold water flows. The cold water passage 223*c* may be provided such that one side thereof communicates with the cold water inlet part 223*a* and the other side thereof communicates with the cold water outlet part 223*b*. In addition, the cold water passage 223*c* may be extended in a different direction from at least one of the first purified water passage part 221*c* and the second purified water passage 222*c*.

In this way, the cold water introduced into the cold water inlet part 223*a* may flow along the cold water passage 223*c* to be discharged through the cold water outlet part 223*b*. In addition, the cold water discharged through the cold water outlet part 223*b* may be discharged to the outside through the outlet part 670 and the discharge port 112 sequentially.

Meanwhile, in the present specification, the first purified water inlet part 221*a*, the second purified water inlet part 222*a*, and the cold water inlet part 223*a* may be referred to as a plurality of inlet parts 221*a*, 222*a*, and 223*a*, and the first purified water outlet part 221*b*, the second purified water outlet part 222*b*, and the cold water outlet part 223*b* may be referred to as a plurality of outlet parts 221*b*, 222*b*, and 223*b*. In addition, the first purified water inlet 221*a*-1, the second purified water inlet 222*a*-1, and the cold water inlet 223*a*-1 may be referred to as a plurality of inlets 221*a*-1, 222*a*-1, and 223*a*-1. The first purified water outlet 221*b*-1, the second purified water outlet 222*b*-1, and the cold water outlet 223*b*-1 may be referred to as a plurality of outlets 221*b*-1, 222*b*-1, and 223*b*-1.

The plurality of inlet parts 221*a*, 222*a*, and 223*a* and the plurality of outlet parts 221*b*, 222*b*, and 223*b* may extend from the inner space of the body part 210 through the plurality of through-holes 212*a* to the outside of the body part 210. For example, the plurality of inlet parts 221*a*, 222*a*, and 223*a* and the plurality of outlet parts 221*b*, 222*b*, and 223*b* may extend in one direction, that is, downward of the water purifier 1. In this case, the plurality of inlet parts 221*a*, 222*a*, and 223*a* and the plurality of outlet parts 221*b*, 222*b*, and 223*b* extend in the same direction, but may also include extensions in one or more directions. For example, the plurality of inlet parts 221*a*, 222*a*, and 223*a* and the plurality of outlet parts 221*b*, 222*b*, and 223*b* may extend in the order of downward, sideward, and downward. In addition, when the flow path module 200 is seated on the seating part 310, the plurality of inlet parts 221*a*, 222*a*, and 223*a* and the plurality of outlet parts 221*b*, 222*b*, and 223*b* may pass through bracket holes 320 to be engaged with a plurality of connectors 631*a*, 632*a*, 641*a*, 642*a*, 651*a*, and 652*a* of the tubing assembly 600.

In addition, the plurality of inlets 221*a*-1, 222*a*-1, and 223*a*-1 and the plurality of outlets 221*b*-1, 222*b*-1, and 223*b*-1 may be exposed to the outside of the body part 210. For example, the plurality of inlets 221*a*-1, 222*a*-1, and 223*a*-1 and the plurality of outlets 221*b*-1, 222*b*-1, and 223*b*-1 may open in the same direction, that is, downward. In addition, at least one of the plurality of inlets 221*a*-1, 222*a*-1, and 223*a*-1 and the plurality of outlets 221*b*-1, 222*b*-1, and 223*b*-1 may be configured to have a different size from another one. For example, the first purified water inlet 221*a*-1 may have a larger diameter than the first purified water outlet 221*b*-1. Due to this, the user can determine that the one having a larger diameter is the first purified water inlet 221*a*-1, and determine the installation direction of the flow path module 200 without confusing the directions of the first purified water inlet 221*a*-1 and the first purified water outlet 221*b*-1. Moreover, the flow path module 200 can be prevented from being installed in an orientation different from the preset orientation.

Referring back to FIG. 3, the flow path module 200 may be seated on the seating portion 310 of the bracket 300, which will be described later, and connected to the tubing assembly 600 when the flow path module 200 is seated in place. In this case, the water pipe 220 of the flow path module 200 is connected to the tubing assembly 600 through a bracket hole 320 to be described later. Here, the correct position of the flow path module 200 means a position where the flow path module 200 is placed in the preset orientation and is seated to match the seating portion 310. Therefore, when the flow path module 200 is not seated in the correct position, that is, when the flow path module 200 is placed in an orientation different from the preset orientation or does not match the seating portion 310, the flow path module 200 interferes with the bracket 300. In this case, the flow path module 200 is not connected to the tubing assembly 600.

As described above, the flow path module 200 is configured to communicate with the tubing assembly 600 when the flow path module 200 is seated in the correct position, so that the user can easily connect the flow path module 200 and the tubing assembly 600. In other words, when the user mounts the flow path module 200 in the correct position on the bracket 300, the flow path module 200 and the tubing assembly 600 can be connected without separate connection with another component.

In addition, when the flow path module 200 is seated in the correct position, the flow path module 200 may be placed on the upper side of the tubing assembly 600. In other words, when viewed from above, at least a portion of the flow path module 200 may overlap with the tubing assembly 600. In addition, when viewed from above, the flow path module 200 is disposed between the filter 500 and the discharge port 112, but may be disposed so as not to overlap with the filter 500. In this case, the arrangement in which the flow path module 200 is placed between the filter 500 and the discharge port 112 means that a central portion of the flow path module 200 is placed between the filter 500 and the discharge port 112 as well as that one end and the other end of the flow path module 200 are placed between the filter 500 and the discharge port 112. In addition, when the flow path module 200 is seated in the correct position, the flow path module 200 may, be placed higher than a temperature control unit. In this specification, it may be understood that the temperature control unit includes the cooler 700, the heater 800, and the cold water flow part 900.

Figure 7:
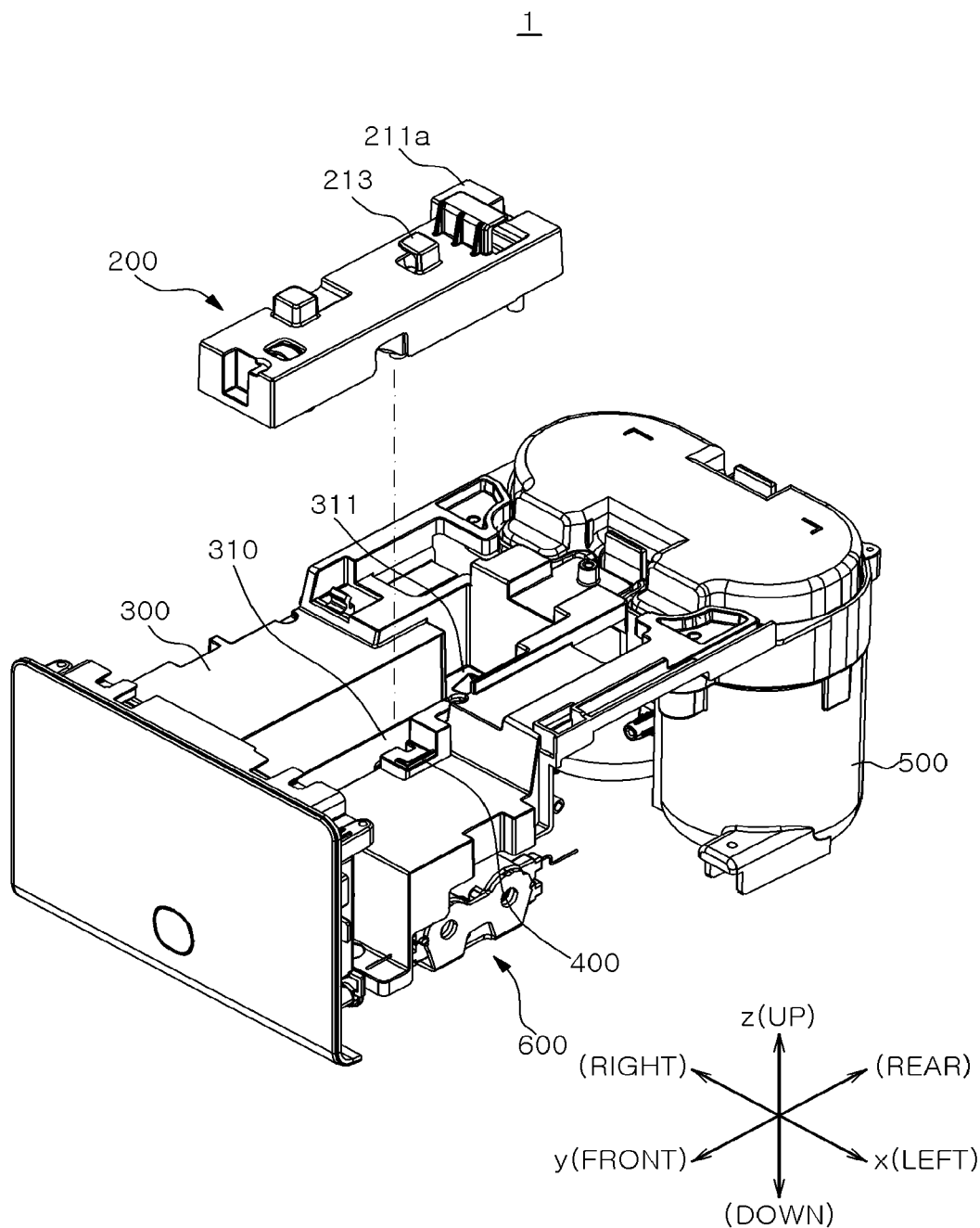
FIG. 7 is a partial perspective view showing an exploded state of the flow path module of FIG. 3.

Meanwhile, referring to FIG. 7, the flow path module 200 seated on the seating portion 310 can be separated from the bracket 300. Further, when the flow path module 200 is separated from the bracket 300, the water pipe 220 of the flow path module 200 is separated from the tubing assembly 600.

As such, the user can separate the water pipe 220 from the tubing assembly 600 by separating the flow path module 200 from the bracket 300, and can easily replace the water pipe 220. In addition, the flow path module 200 is configured in a manner that the plurality of water pipes 220 are integrated in the body part 210, so that the user can replace the plurality of water pipes 220 in one operation without separating the plurality of water pipes 220 from each other. In other words, since the plurality of water pipes 220 are provided as one module, the replacement of the plurality of water pipes 220 can be performed with easier.

Meanwhile, purified water and cold water may flow through the plurality of water pipes 220 described above. In addition, a pipe through which hot water flows in the water purifier 1 may not be provided within the flow path module 200 but may be provided separately from the flow path module 200. This is to prevent the user from being injured by hot water in the process of replacing the flow path module 200 since the user can easily replace the flow path module 200. Accordingly, the pipe through which hot water flows is separately disposed inside the water purifier 1, and the user can replace the flow path module 200 without risk of injury due to hot water.

Figure 8:
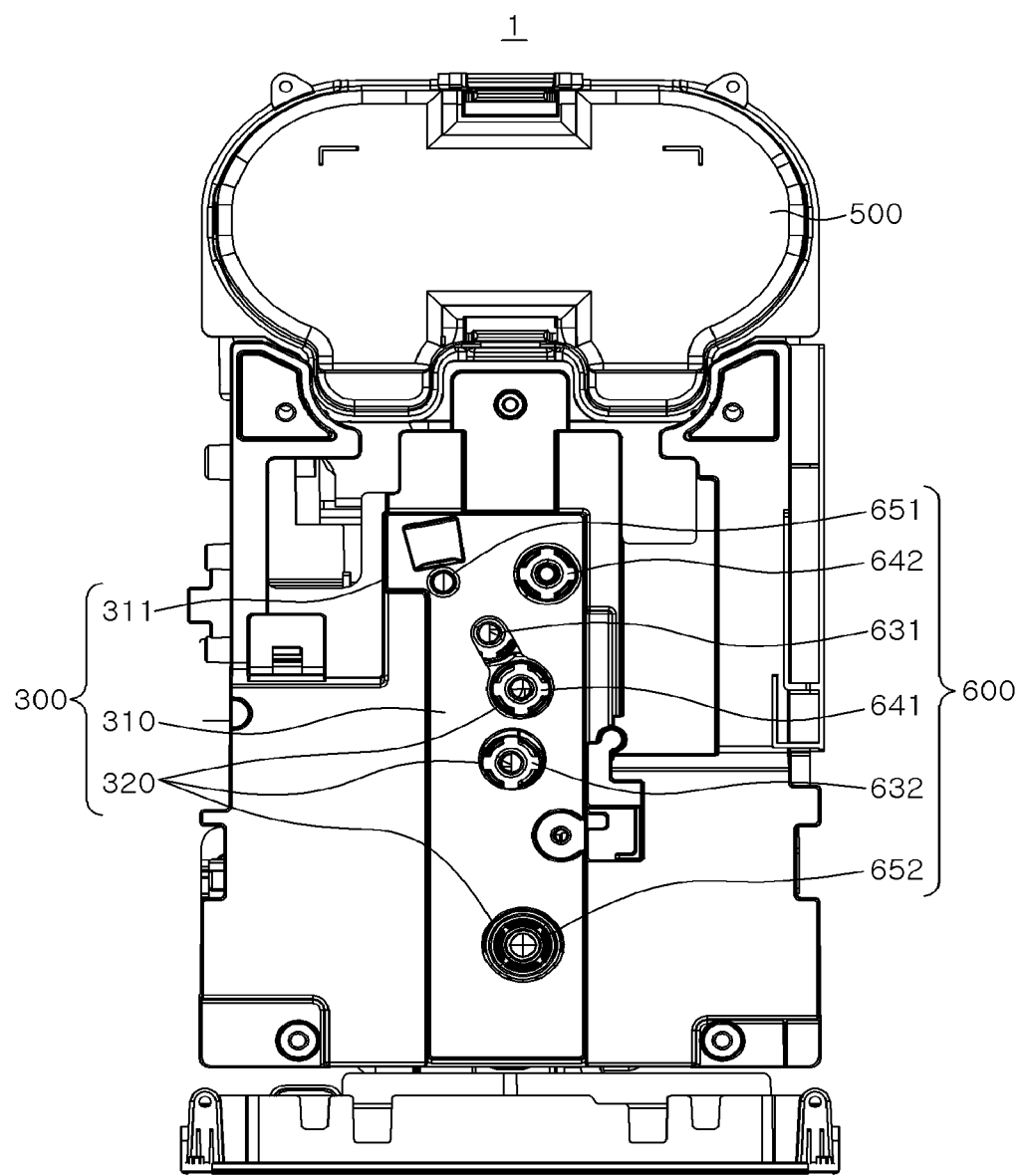
FIG. 8 is a plan view in which the flow path module is omitted in FIG. 7.

Referring to FIGS. 7 and 8, the bracket 300 may support the flow path module 200 and may provide a portion where the flow path module 200 is seated. The bracket 300 may be supported on the main frame 110 and may be disposed on the upper side of the tubing assembly 600. In addition, a seating portion 310 and bracket holes 320 may be formed in the bracket 300.

The seating portion 310 may provide a portion where the body part 210 of the flow path module 200 is seated. For example, the seating portion 310 may be a recess depressed downward from the bracket 300. In addition, the seating portion 310 may be formed to correspond to the shape of the body part 210. As a more detailed example, the seating portion 310 may be formed to surround at least a portion of a lower surface and a side surface of the body part 210 when the body part 210 is seated on the seating portion 310. The seating portion 310 may include the engaging portion 311.

The engaging portion 311 may be formed in the bracket 300 so that the body part 31 is seated in the preset orientation when the body part 311 is seated on the seating portion 310. The engaging portion 311 may be provided to be engaged with the orientation determination portion 211a of the body part 210, and may be formed to correspond to the shape of the orientation determination portion 211a as an example.

The bracket hole 320 may be formed in the bracket 300 so that the water pipe 220 of the flow path module 200 penetrates therethrough. A plurality of bracket holes 320 may be provided, and the plurality, of bracket holes 320 may be formed to correspond to the positions of the plurality of water connectors 630, 640, and 650. In addition, the plurality of bracket holes 320 may be formed to correspond to the position of the water pipe 220 when the flow path module 200 is seated to the seating portion 310.

Meanwhile, the plurality of water pipes 220 may penetrate through the plurality of bracket holes 320, respectively. For example, when the flow path module 200 is seated in the correct position on the seating portion 310, the plurality of water pipes 220 penetrate through the plurality of through-holes 212a to be connected with the tubing assembly 600. As another example, when the flow path module 200 is not seated in the correct position on the seating portion 310, the plurality of water pipes 220 interferes with the bracket 300 without penetrating through the through-hole 212a.

Figure 9:
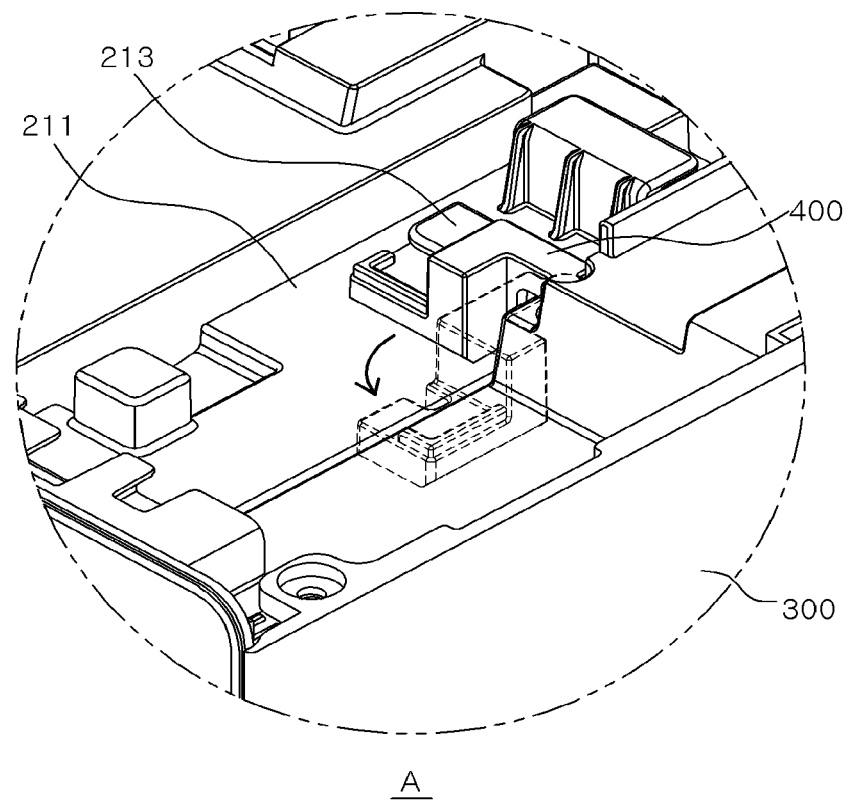
FIG. 9 is an enlarged view of part A of FIG. 3.
Figure 10:
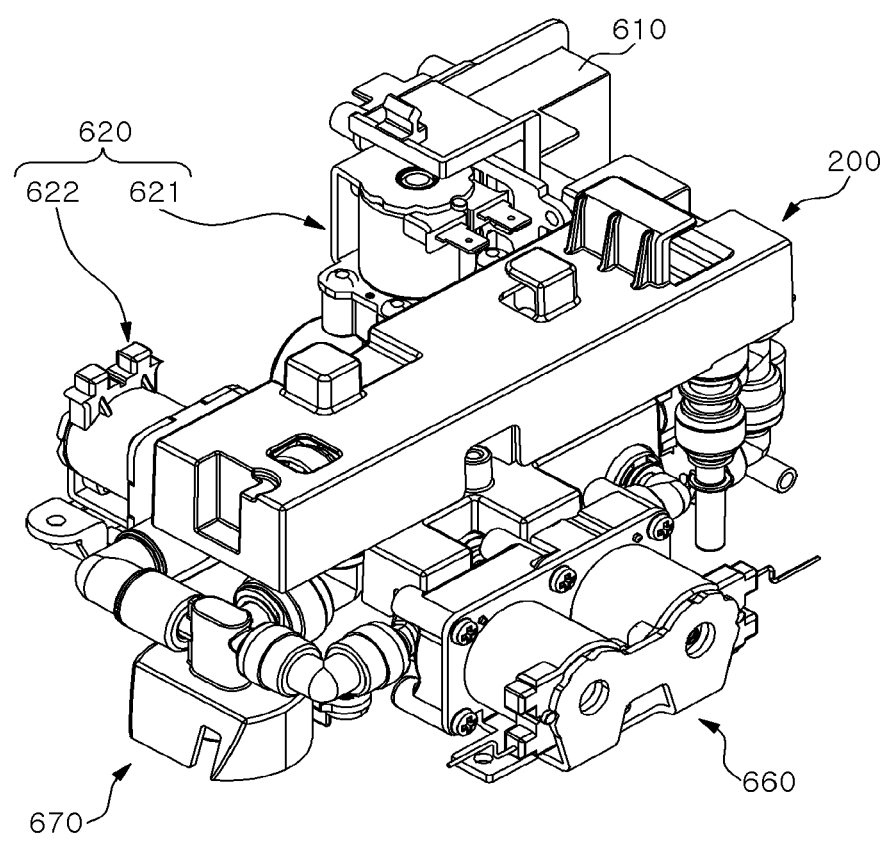
FIG. 10 is a perspective view illustrating a state in which the flow path module of FIG. 3 and a tubing assembly are connected.
Figure 11:
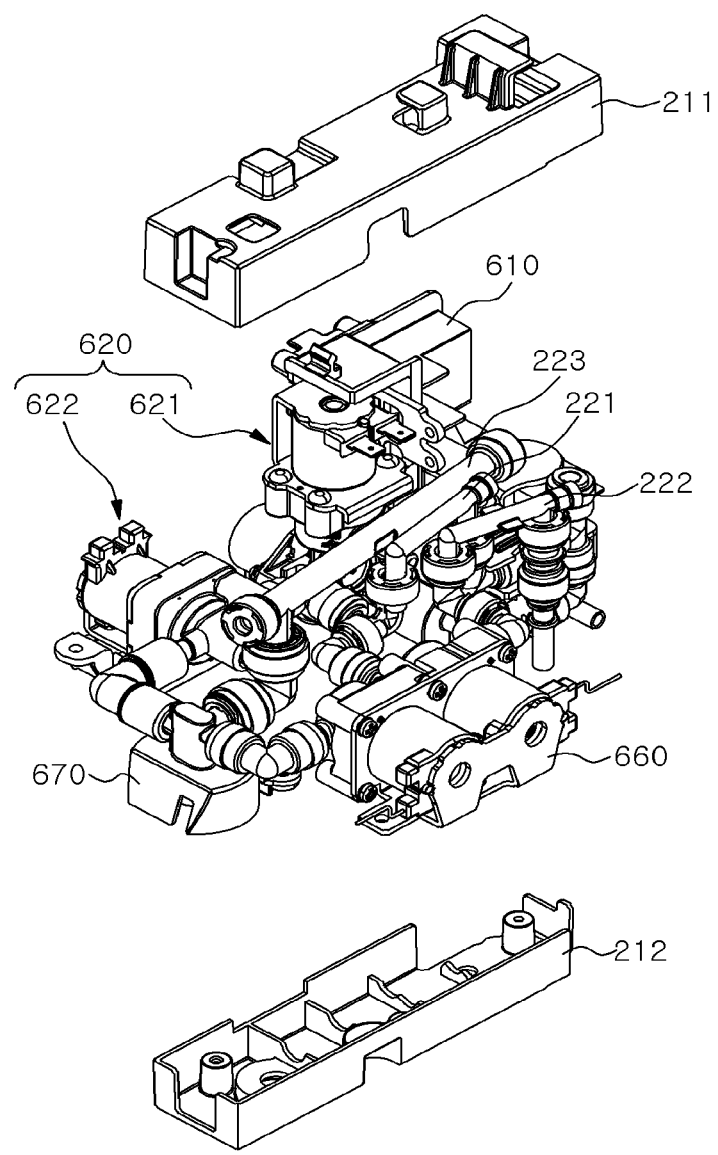
FIG. 11 is a perspective view showing an exploded state of a body part of FIG. 10.

Referring to FIG. 9, the separation preventing member 400 can prevent the flow path module 200 seated in the correct position on the seating portion 310 from being separated from the bracket 300. For example, the flow path module 200 seated in the correct position is connected to the tubing assembly 600, and water may flow between the flow path module 200 and the tubing assembly 600. As such, when the flow path module 200 is separated from the seating portion 310 while the water is flowing between the flow path module 200 and the tubing assembly 600, the water leaks between the flow path module 200 and the tubing assembly 600. Accordingly, the separation preventing member 400 may prevent the flow path module 200 from being separated from the seating portion 310 so that the connection between the flow path module 200 and the tubing assembly 600 is maintained.

The separation preventing member 400 may be configured such that one end thereof is supported by the bracket 300 and the other end thereof selectively interferes with the upper side of the flow path module 200 seated in the correct position. For example, one end of the separation preventing member 400 may be rotatably supported by the bracket 300, sand the other end thereof is rotated to the upper side of the body part 210 seated in the correct position, so that the separation preventing member 400 can prevent the body part 210 from being separated from the seating portion 310. As a more detailed example, the other end of the separation preventing member 400 may be formed to be inserted in the hook 213 of the body part 210. Accordingly, the separation preventing member 400 may be engaged with the hook 213 to prevent the body part 210 from moving upward.

Meanwhile, when the separation preventing member 400 is placed on the upper side of the flow path module 200 to prevent the flow path module 200 from being separated, the cover frame 120 may be allowed to be placed in the cover position. For example, when the separation preventing member 400 is engaged with the hook 213 or is placed on the upper side of the flow path module 200 (see the separation preventing member 400 shown in the solid line of FIG. 9), the cover frame 120 can be placed in the cover position. In addition, when the other end of the separation preventing member 400 is not placed on the upper side of the flow path module 200 and the flow path module 200 is allowed to be separated from the seating portion 310 (see the separation preventing member 400 shown in the dotted line of FIG. 9), the separation preventing member 400 may interfere with the cover frame 120 so that the cover frame 120 could not be placed in the cover position. For example, when the separation preventing member 400 is rotated and the flow path module 200 can be separated from the seating portion 310, the cover frame 120 is caught by the separation preventing member 400 without being placed in the cover position.

As described above, when the flow path module 200 is in a separable state from the bracket 300, the separation preventing member 400 can allow the user to recognize that the flow path module 200 is in the separable state by preventing the cover frame 120 from being placed in the cover position. In this way, the user can check once again whether the separation preventing member 400 is not engaged with the flow path module 200.

In addition, the separation preventing member 400 can maintain the connection between the flow path module 200 and the tubing assembly 600 by preventing the flow path module 200 seated in the correct position from being separated. Accordingly, it is possible to prevent water from leaking between the flow path module 200 and the tubing, assembly 600 connected to each other.

Meanwhile, the water, purifier 1 may further include a rotary actuator (not shown). The rotary actuator may be operated to rotate the separation preventing member 400 in one direction. For example, when the flow path module 200 is seated in the correct position on the bracket 300, the rotary actuator may rotate the separation preventing member 400 to the upper side of the flow path module 200 to prevent the flow path module 200 from being separated from the bracket 300. In addition, when the flow path module 200 needs to be replaced, the rotary actuator may rotate the separation preventing member 400 to allow the flow path module 200 to be separated from the bracket 300. The operation of the rotary actuator may, be controlled by the circuit board 1100.

The filter 500 may filter raw water introduced into the water purifier 1 to be purified water. Raw water passing through the NOS valve 1000 to be described later may flow into the filter 500, and purified water filtered by the filter 500 may flow into the first purified water, pipe 221 of the flow path module 200. In addition, one or more filters 500 may be provided, and may be provided to the main frame 110 to be replaceable. For example, one or more filters 500 may be disposed on the rear side of the water purifier 1.

Referring to FIGS. 10 to 13, the tubing assembly 600 may connect one or more of the discharge port 112, the filter 500, the cooler 700, and the cold water flow part 900 to the flow path module 200. For example, purified water filtered by the filter 500 may flow into the flow path module 200 through the tubing assembly 600. As another example, cold water cooled in the cold water flow part 900 may flow into the flow path module 200 through the tubing assembly 600. In addition, the tubing assembly 600 may connect some of the plurality of water pipes 220 of the flow path module 200 to each other. For example, in the tubing assembly 600, purified water received from the first purified water pipe 221 may flow into the second purified water pipe 222.

As such, the tubing assembly 600 may connect the flow path module 200 to other components (e.g., the cold water flow part 900). In addition, the tubing assembly 600 may connect some of the plurality of water pipes 220 of the flow path module 200. In this way, even when the flow path module 200 is selectively connected to the tubing assembly 600, the flow path module 200 may be connected to other components (e.g. the discharge port 112) only by connecting the tubing assembly 600 and the flow path module 200. In addition, since the flow path module 200 does not have to be directly connected to the discharge port 112, the filter 500, the cooler 700, and the cold water flow part 900, the plurality of water pipes 220 can be integrated and the size of the flow path module 200 can be miniaturized.

In addition, the tubing assembly 600 may provide a passage through which water flows. For example, one or more of raw water, purified water, cold water, and hot water may flow through the tubing assembly 600. The tubing assembly 600 may be disposed below the bracket 300 and may be selectively connected to the flow path module 200 seated on the bracket 300. In addition, when connected to the flow path module 200, the tubing assembly 600 may communicate with the plurality of water pipes 220. In this case, the tubing assembly 600 may form a water flow path together with the flow path module 200. For example, purified water and cold water may flow along the water flow path between the tubing assembly 600 and the flow path module 200 and alternately flow between the tubing assembly 600 and the flow path module 200.

In addition, when the tubing assembly 600 is connected to the flow path module 200, at least a portion of the plurality of water pipes 220 can be selectively opened and closed. For example, the tubing assembly 600 may block the first purified water pipe 221. In this case, purified water cannot flow from the first purified water pipe 221 to the first purified water outlet connector 632.

The tubing assembly 600 may include a support body 610, a hot water valve 620, a first purified water connector 630, a second purified water connector 640, a cold water connector 650, a feed valve 660, an outlet part 670, and a sealing member 680.

The support body 610 may support at least a portion of the hot water part 620, the first purified water connector 630, the second purified water connector 640, and the cold water connector 650. In addition, the support 610 may support the NOS valve 1000 disposed adjacent thereto. The support 610 may be provided with a pipe to guide cold water cooled in the cooler 700 to the cold water inlet connector 651.

The hot water valve 620 may be operated to control the flow rate of purified water flowing toward the heater 800 or the flow rate of hot water discharged from the heater 800. The hot water valve 620 may guide purified water to the heater 800 and guide hot water heated by, the heater 800 to the outlet part 660. In addition, the hot water valve 620 may include a first hot water valve 621 which controls the flow rate of purified water flowing into the heater 800 and a second hot water valve 622 which controls the flow rate of hot water discharged from the heater 800. The operations of the first hot water valve 621 and the second hot water valve 622 may be controlled by the circuit board 1100.

Referring back to FIG. 12, the first purified water connector 630 may provide a passage through which purified water flows. In addition, the first purified water connector 630 may be, selectively connected to the first purified water pipe 221. The first purified water connector 630 may include a first purified water inlet connector 631 and a first purified water outlet connector 632.

The first purified water inlet connector 631 may provide a passage through which purified water flows. In addition, the first purified water inlet connector 631 may introduce purified water passing through the filter 500 and guide the introduced purified water to the first purified water pipe 221. The first purified water inlet connector 631 may be selectively engaged with the first purified water inlet, part 221a of the first purified water pipe 221. In addition, a first purified water inlet connector port 631a may be formed in the first purified water inlet connector 631. The first purified water inlet connector port 631a may communicate with the first purified water inlet 221a-1.

The first purified water outlet connector 632 may provide a passage through which purified water flows. In addition, the first, purified water outlet connector 632 may introduce purified water passing through the first purified water pipe 221 and guide the introduced purified water to the feed valve 660. The first purified water outlet connector 632 may be selectively engaged with the first purified water outlet part 221*b* of the first purified water pipe 221. Moreover, a first purified water outlet connector port 632*a* may be formed in the first purified water outlet connector 632. The first purified water outlet connector port 632*a* may communicate with the first purified water outlet 221*b*-1.

The second purified water inlet connector 641 may provide a passage through which purified water flows. In addition, the second purified water inlet connector 641 may introduce purified water passing through the feed valve 660 and guide the introduced purified water to the second purified water pipe 222. The second purified water inlet connector 641 may be selectively engaged with the second purified water inlet part 222*a* of the second purified water pipe 222. Further, a second purified water inlet connector port 641*a* may be formed in the second purified water inlet connector 641. The second purified water inlet connector port 641*a* may communicate with the second purified water inlet 222*a*-1.

The second purified water outlet connector 642 may provide a passage through which purified water flows. In addition, the second purified water outlet connector 642 may introduce purified water passing through the second purified water pipe 222 and guide the introduced purified water to the cooler 700. The second purified water outlet connector 642 may be selectively engaged with the second purified water outlet part 222*b* of the second purified water pipe 222. Further, a second purified water outlet connector port 642*a* may be formed in the second purified water outlet connector 642. The second purified water outlet connector port 642*a* may communicate with the second purified water outlet 222*b*-1.

The cold water inlet connector 651 may provide a passage through which cold water flows. In addition, the cold water inlet connector 651 may introduce cold water passing through the cooler 700 and guide the introduced cold water to the cold water pipe 223. The cold water inlet connector 651 may be selectively engaged with the cold water inlet part 223*a* of the cold water pipe 223. Moreover, a cold water inlet connector port 651*a* may be formed in the cold water inlet connector 651. The cold water inlet connector port 651*a* may communicate with the cold water inlet 223*a*-1.

The cold water outlet connector 652 may provide a passage through which cold outlet connector 652 may introduce cold water passing through the cold water pipe 223 and guide the introduced cold water to the discharge unit 660. The cold water outlet connector 652 may be selectively engaged with the cold water outlet part 223*b* of the cold water pipe 223. Further, a cold water outlet connector port 652*a* may be formed in the cold water outlet connector 652. The cold water outlet connector port 652*a* may communicate with the cold water outlet 223*b*-1.

Meanwhile, in the present specification, the first purified water connector 630 the second purified water connector 640, and the cold water connector 650 may be referred to as a plurality of water connectors 630, 640, and 650. In addition, the first purified water inlet connector 631*a*, the first purified water outlet connector 632*a*, the second purified water inlet connector 641*a*, the second purified water outlet connector 642*a*, the cold water inlet connector 651*a* and the cold water outlet connector 652*a* may be referred to as a plurality of connectors 631*a*, 632*a*, 641*a*, 642*a*, 651*a*, and 652*a*.

The plurality of connectors 631*a*, 632*a*, 641*a*, 642*a*, 651*a*, and 652*a* may be engaged with the plurality of inlet parts 221*a*, 222*a*, and 223*a*, or the plurality of outlet parts 221*b*, 222*b*, and 223*b*. In addition, the plurality of connectors 631*a*, 632*a*, 641*a*, 642*a*, 651*a*, and 652*a* may have sizes corresponding to the plurality of inlets 221*a*-1, 222*a*-1, and 223*a*-1 and the plurality of outlets 221*b*-1, 222*b*-1, and 223*b*-1 respectively. For example, the plurality of connectors 631*a*, 632*a*, 641*a*, 642*a*, 651*a*, 652*a* may open upward. In addition, since the plurality of connectors 631*a*, 632*a*, 641*a*, 642*a*, 651*a*, 652*a* are, opened upward, the plurality of connectors 631*a*, 632*a*, 641*a*, 642*a*, 651*a*, and 652*a* may communicate with the plurality of inlets 221*a*-1, 222*a*-1, and 223*a*-1 or the plurality of outlets 221*b*-1, 222*b*-1, and 223*b*-1 which are open downward.

As such, the plurality of connectors 631*a*, 632*a*, 641*a*, 642*a*, 651*a*, and 652*a* are open upward, so that the plurality of inlet parts 221*a*, 222*a*, and 223*a* or the plurality of outlet parts 221*b*, 222*b*, and 223*b* extending downward can be easily inserted into the plurality of connectors 631*a*, 632*a*, 641*a*, 642*a*, 651*a*, and 652*a*. In other words, the flow path module 200 can be easily connected to the tubing assembly 600 by moving downward.

The feed valve 660 may be operated to control the flow rate of purified water discharged from the first purified water pipe 221. In addition, the feed valve 660 may flow purified water to the outlet part 670 or the second purified water pipe 222. For example, purified water discharged from the first purified water pipe 221 may flow into the feed valve 660 to be divided. Further, some of the purified water divided by the feed valve 660 may flow to the outlet part 670 and the other purified water may flow to the second purified water pipe 222. The feed valve 660 may be connected to the first purified water outlet connector 632 and the second purified water inlet connector 641.

Meanwhile, the feed valve 660 may block one end of the second purified water inlet connector 641 when the flow path module 200 is separated from the tubing assembly 600. As a result, the purified water discharged from the first purified water pipe 221 does not flow to the second purified water pipe 222. In addition, even while the flow path module 200 is connected to the tubing assembly 600, when the separation preventing member 400 is placed in a position at which the separation of the flow path module 200 is allowed, the feed valve 660 may block one end of the second purified water inlet connector 641. The operation of the feed valve 660 may be controlled by the circuit board 1100.

As such, even while the flow path module 200 is connected to the tubing assembly 600, when the flow path module 200 can be separated from the bracket 300, the feed valve 660 blocks the flow of purified water so that water leakage between the flow path module 200 and the tubing assembly 600 can be prevented.

The outlet part 670 may discharge any one of purified water, cold water, and hot water through the discharge port 112. In addition, the outlet part 670 may be connected to the hot water valve 620, the cold water outlet connector port 652, and the feed valve 660. For example, the outlet part 670 may guide hot water introduced from the hot water valve 620 to the discharge port 112, and may guide cold water introduced from the cold water outlet connector port 652 to the discharge port 112. Moreover, the outlet part 670 may guide the purified water introduced from the feed valve 660 to the discharge port 112.

Figure 14:
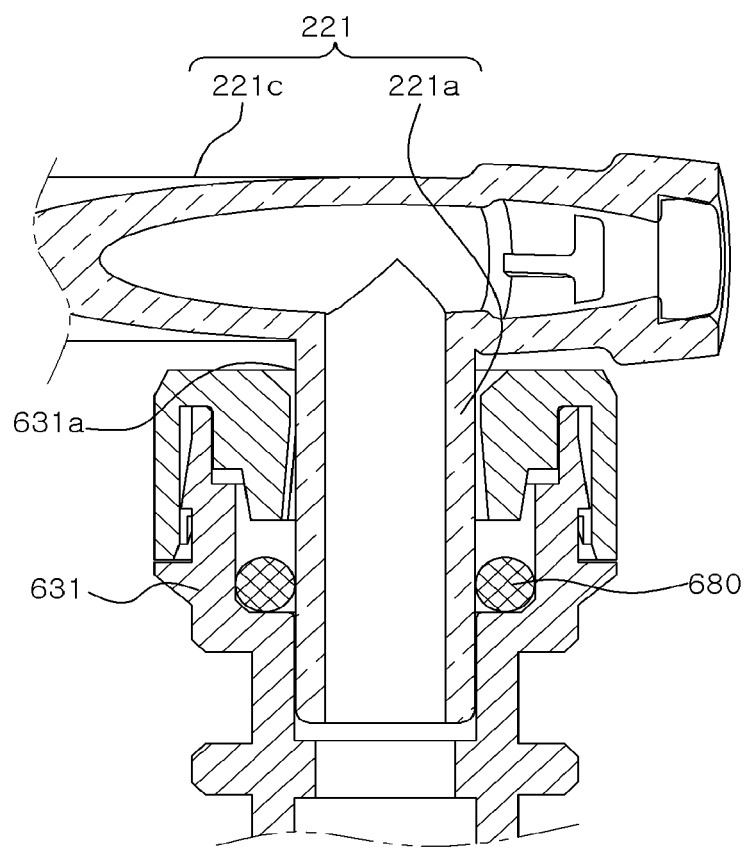
FIG. 14 is a partial cross-sectional view of a first purified water pipe and a first purified water inlet connector of FIG. 11 taken in a longitudinal direction.

Referring to FIG. 14, the sealing member 680 can prevent water from leaking between the first purified water inlet part 221*a* and the first purified water inlet connector 631*a* when the first purified water inlet part 221*a* is inserted into the first purified water inlet connector 631*a*. For example, the sealing member 680 may be an O-ring inserted between the first purified water inlet part 221a and the first purified water inlet connector 631a. Meanwhile, in FIG. 14, it has been described that the sealing member 680 is provided between the first purified water inlet part 221a and the first purified water inlet connector 631a, but this is only an example and a plurality of sealing members 680 may be provided. Accordingly, the plurality of sealing members 680 can seal between the plurality of inlet parts 221a, 222a, and 223a or the plurality of outlet parts 221b, 222b, and 223b and the plurality of connectors 631a, 632a, 641a, 642a, 651a, and 652a.

The cooler 700 may provide cold water by cooling purified water to a predetermined temperature or less. The cooler 700 may be disposed above the cold water flow part 900, and the cold water discharged from the cooler 700 may flow to the cold water flow part 900.

The heater 800 may provide hot water by heating purified water to a predetermined temperature or higher. The purified water may flow from the first hot water valve 621 to flow into the heater 800, and the hot water provided from the heater 800 may flow into the second hot water valve 622.

The cold water flow part 900 may provide a space through which cold water supplied from the cooler 700 flows. In addition, the cold water flow part 900 may, provide a space for storing the cold water cooled by the cooler 700. For example, the cold water flow part 900 may be configured in the form of a water tank to provide a space in which cold water flows and a space in which cold water is stored. In addition, as another example, the cold water flow part 900 may be configured in the form of a thin pipe or a water tank with partition walls installed therein to provide a space in which purified water flows as soon as it is cooled.

The NOS valve 1000 may be operated to control the flow rate of raw water introduced from the outside. For example, the NOS valve 1000 may be a valve capable of opening and closing a passage through which raw water flows, and may control the flow rate of raw water by opening and closing the passage through which raw water flows. Driving of the NOS valve 1000 may be controlled by the circuit board 1100. In addition, the NOS valve 1000 may guide raw water to the filter 500. The NOS valve 1000 may be disposed adjacent to the tubing assembly 600.

The circuit board 1100 may control the operation of the tubing assembly 600. For example, the circuit board 1100 may control the NOS valve 1000 to open the passage through which raw water flows. In addition, the circuit board 1100 may control the first hot water valve 621 to open a passage through which the purified water passing through the filter 500 flows, and control the second hot water valve 622 to open a passage through which hot water flows.

As another example, the circuit board 1100 may control the feed valve 660 so that the purified water discharged from the first purified water pipe 221 flows to one or more of the outlet part 670 and the second purified water pipe 222. In addition, the circuit board 1100 may control one or more of the NOS valve 1000 and the feed valve 660 so that no water flows when the flow path module 200 and the tubing assembly 600 are separated from each other. As a more specific example, the circuit board 1100 controls one or more of the NOS valve 1000 and the feed valve 660 so that no water flows when the flow path module 200 is not seated in the correct position, that is, when the plurality of water pipes 221, 222, and 223 are not connected to the plurality of water connectors 630, 640, and 650. Here, the case where the flow module 200 is not seated in the correct position includes a case where any, one of the plurality of water pipes 221, 222, and 223 is not connected to the plurality of water connectors 630, 640, and 650.

As another example, the circuit board 1100 controls one or more of the NOS valve 1000 and the feed valve 660 so that no water flows when the separation preventing member 400 is placed in a position at which the separation of the flow path module 200 is allowed even while the flow path module 200 is seated in the correct position.

Meanwhile, the circuit board 1100 may control the operation of the outlet part 670. When a user's selection is input, the circuit board 1100 may control the outlet part 670 to discharge one of purified water, cold water, and hot water based on the user's selection. For example, when a user inputs cold water discharge, the circuit board 1100 controls the outlet part 670 to discharge cold water.

The circuit board 1100 may include a plurality of boards and a plurality of wires, and may be fixedly supported by the cover frame 120. Accordingly, the circuit board 1100 may be separated from the bracket 300 together with the cover frame 120 when the cover frame 120 is separated from the bracket 300.

As such, the circuit board 1100 can be easily exposed to the outside by being separated together with the cover frame 120. In addition, the maintenance of the circuit board 1100 can easily be performed since the circuit board 1100 is fixedly supported on the main frame 110 while being separated together with the cover frame 120.

The circuit board 1100 described above may be implemented by an arithmetic device including a microprocessor, a measurement device such as a sensor, and a memory, and since the implementation method thereof is obvious to those skilled in the art, further detailed descriptions are omitted.

Hereinafter, referring to FIG. 13, the flow of water inside the water purifier 1 will be described.

Raw water supplied from the outside of the water purifier 1 passes through the NOS valve 1000 to flow to the filter 500. Some of purified water filtered by the filter 500 flows to the hot water valve 620, and the other part flows to the first purified water pipe 221 of the flow path module 200. The purified water flowing into the hot water valve 620 is heated in the heater 800 and provided to the user as hot water through the outlet part 670 and the discharge port 112 sequentially.

In addition, purified water flowing into the first purified water pipe 221 flows to the feed valve 660. Some of the purified water flowing into the feed valve 660 is provided to the user as purified water through the outlet part 670 and the discharge port 112 sequentially.

Further, the other part of the purified water flowing into the feed valve 660 flows into the cooler 700 through the second purified water pipe 222. The purified water introduced into the cooler 700 is cooled and provided to the user as cold water through the cold water flow part 900, the cold water pipe 223, the outlet part 670, and the discharge port 112 sequentially.

Hereinafter, the operation of the water purifier 1 having the above configuration will be described.

A user can use the water purifier 1 according to one embodiment of the present disclosure to filter water supplied from the outside. The water purifier 1 can provide purified water to the user by filtering raw water. In addition, the water purifier 1 can provide cold water or hot water to the user by cooling or heating the purified water according to the user's selection.

Meanwhile, the plurality of water pipes 220 provided to allow water to flow in the water purifier 1 need to be replaced due to water stains when used for a long time. In this case, the user can separate the upper cover of the main frame 110 and separate the cover frame 120 from the bracket 300. In addition, the cover frame 120 separated from the bracket 300 and placed in the open fixed position can be maintained in the open fixed position by, the fixture 121 being caught on the rib 111 of the main frame 110. Then, the user rotates the separation preventing member 400 so that the flow path module 200 can be separated from the bracket 300. As such, when the flow path module 200 is placed in a separable state, the user can separate the flow path module 200 from the bracket 300.

In addition, the user can replace the flow path module 200 with another flow path module 200 and mount it on the bracket 300. In this case, the user can connect the flow path module 200 and the tubing assembly 600 by mounting the flow path module 200 to match the seating portion 310. Moreover, when the user rotates the separation preventing member 400 to be engaged with the hook 213, the connection between the flow path module 200 and the tubing assembly 600 can be maintained. Thereafter, the replacement of the flow path module 200 can be completed by moving the cover frame 120 to the cover position.

Although the embodiments of the present disclosure have been described as specific embodiments, these are merely examples. The present disclosure is not limited to the above, and should be construed as having the widest scope according to the technical idea disclosed herein. Those skilled in the art may combine/substitute the disclosed embodiments to implement a pattern of a shape not disclosed, but this also does not deviate from the scope of the present disclosure. In addition, those skilled in the art may easily change or modify the disclosed embodiments based on the present specification, and it is clear that such changes or modifications also fall within the scope of the present disclosure.

What is claimed is:

1. A water purifier comprising:
   a filter for filtering raw water to provide purified water;
   a discharge port through which the purified water is discharged to an outside;
   a plurality of water pipes providing a flow space for the purified water to flow;
   a flow path module including a body part supporting the plurality of water pipes; and
   a tubing assembly detachably connected to the plurality of water pipes, the tubing assembly serving to selectively open and close at least a portion of the plurality of water pipes when connected to the plurality of water pipes,
   wherein the tubing assembly has one side connected to the filter and the other side connected to the flow path module, and the flow path module receives the purified water filtered by the filter through the tubing assembly,
   wherein the flow path module is placed above the tubing assembly, and is disposed between the filter and the discharge port while overlapping at least a portion of the tubing assembly without overlapping the filter when viewed from above,
   wherein each of the plurality of water pipes includes a passage part through which the purified water flows, an inlet part provided on one side of the passage part through which the purified water flows in and including an inlet, and an outlet part provided on the other side of the passage part through which the purified water is discharged and including an outlet, and
   wherein the inlet and the outlet provided in each of the plurality of water pipes are exposed to the outside of the body part and opened downward.

2. The water purifier of claim 1, wherein the inlet part and the outlet part provided in each of the plurality of water pipes are extended downward.

3. The water purifier of claim 1, wherein the body part supports the passage part, and has a plurality of through holes,
   the inlet part and the outlet part protrude outward from the body through the plurality of through holes, and
   the plurality of through holes are formed on a same surface of the body part.

4. The water purifier of claim 1, wherein at least a portion of the passage parts of the plurality of water pipes extend in different directions, and
   each of the plurality of water pipes is configured such that the flow space does not communicate with each other in the body part.

5. The water purifier of claim 1, wherein the inlet and the outlet provided in at least one of the plurality of water pipes have different sizes from each other, and
   at least one of the plurality of water pipes has a different shape from another one thereof.

6. The water purifier of claim 1, wherein the tubing assembly includes a plurality of connectors which are selectively engaged with the inlet parts and the outlet parts of the plurality of water pipes, respectively,
   each of the inlet parts and the outlet parts of the plurality of water pipes has a predetermined rigidity so that a shape thereof does not change when engaged with the connector,
   the inlet and the outlet provided in at least one of the plurality of water pipes have different sizes from each other, and
   each of the plurality of connectors has a size corresponding to the inlet and the outlet provided in each of the plurality of water pipes.

7. The water purifier of claim 1, wherein an orientation determination portion having a protrusion or recess shape is provided on an outer surface of the body part so that the body part has an asymmetrical shape, and
   the orientation determination portion has a shape protruding or depressed laterally from the outer surface of the body part.

8. The water purifier of claim 1, further comprising:
   a cooler for cooling the purified water to provide cold water; and
   a cold water flow part through which the cold water obtained by the cooler flows,
   wherein the flow path module is disposed above the cooler and the cold water flow part.

9. The water purifier of claim 1, further comprising:
   a frame including a main frame and a cover frame,
   wherein the cover frame is configured such that the cover frame is placed in a cover position where the cover frame covers the flow path module or separated from the cover position so that the flow path module is exposed to the outside.

10. The water purifier of claim 9, further comprising:
    a circuit board, for controlling operation of the water purifier, supported by the cover frame,
    wherein when the cover frame is separated from the cover position, the circuit board is separated from the cover position together with the cover frame.

11. The water purifier of claim 9, further comprising:
    a bracket having a seating portion on which the body part is seated when the flow path module is connected to the tubing assembly, wherein the seating portion is a hole concavely formed in the bracket to surround at least a portion of a lower surface and at least a portion of a side surface of the flow path module, wherein when placed in the cover position, the cover frame is disposed above the bracket to cover an upper surface of the flow path module, wherein an orientation determination portion, having a protrusion or recess shape, for guiding a direction in which the flow path module is seated in the seating portion is provided on an outer surface of the body part, wherein the seating portion is provided with an engaging part having a shape corresponding to the orientation determination portion, and wherein the orientation determination portion engages with the engaging part when the flow path module is seated in a predetermined direction on the seating portion, and when the flow path module is seated in the seating portion in a direction different from the predetermined direction, the orientation determination portion does not engage with the engaging part and interferes with the bracket.

12. The water purifier of claim 1, further comprising:
a bracket having a seating portion on which the body part is seated when the flow path module is connected to the tubing assembly; and
a separation preventing member for preventing the flow path module from being separated from the bracket when the flow path module is connected to the tubing assembly, wherein the separation preventing member is supported by the bracket and selectively interferes with an upper side of the body part of the flow path module to prevent separation of the flow path module.

13. The water purifier of claim 12, further comprising:
a cover frame that covers the flow path module when a position of the cover frame relative to the bracket is a cover position, wherein the separation preventing member allows the cover frame to be placed in the cover position when selectively interfering with the flow path module to prevent separation of the flow path module, and wherein the separation preventing member interferes with the cover frame to prevent the cover frame from being placed in the cover position when allowing the flow path module to be separated from the seating portion.

14. The water purifier of claim 13, further comprising:
a main frame that accommodates the filter and the tubing assembly, wherein the cover frame is placed in an open fixed position where the cover frame is engaged and fixed to the main frame in an inclined state with respect to the cover frame in the cover position, or the cover position.

15. The water purifier of claim 13, wherein the body part is provided with a protruding hook, and wherein when engaged with the hook, the separation preventing member selectively interferes with the flow path module to prevent separation of the flow path module and allows the cover frame to be placed in the cover position.

\* \* \* \* \*